(12) United States Patent
Menegazzo et al.

(10) Patent No.: US 11,884,243 B2
(45) Date of Patent: *Jan. 30, 2024

(54) ASSEMBLIES FOR SUPPORTING A LOAD RELATIVE TO A ROOF OF A VEHICLE

(71) Applicant: ARB Corporation Ltd, Kilsyth (AU)

(72) Inventors: Andrew Guy Menegazzo, Kilsyth (AU); James Kenneth Robert Luke, Kilsyth (AU); Gavin James Smith, Kilsyth (AU)

(73) Assignee: ARB Corporation Ltd., Kylsith (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,014

(22) Filed: Feb. 14, 2022

(65) Prior Publication Data

US 2022/0234512 A1 Jul. 28, 2022

Related U.S. Application Data

(63) Continuation-in-part of application No. 16/738,144, filed on Jan. 9, 2020, now Pat. No. 11,279,294.

(30) Foreign Application Priority Data

Jan. 10, 2019 (AU) .............................. 2019900072
Jun. 6, 2019 (AU) .............................. 2019901954

(51) Int. Cl.
*B60R 9/04* (2006.01)
*B60R 9/045* (2006.01)
*B60R 9/048* (2006.01)

(52) U.S. Cl.
CPC .............. *B60R 9/045* (2013.01); *B60R 9/048* (2013.01)

(58) Field of Classification Search
CPC ........... B60R 9/04; B60R 9/045; B60R 9/058; B60R 9/052
See application file for complete search history.

(56) References Cited

U.S. PATENT DOCUMENTS

| 3,545,660 | A | 12/1970 | Stephen |
| 4,099,658 | A | 7/1978 | Bott |
| 4,269,340 | A | 5/1981 | Kowalski et al. |
| 4,274,570 | A | 6/1981 | Bott |

(Continued)

FOREIGN PATENT DOCUMENTS

| AU | 331951 | 6/2010 |
| AU | 331952 | 6/2010 |

(Continued)

OTHER PUBLICATIONS

Roof rack page of the Hannibal website, published at least as early as Feb. 11, 2010 (accessed through the Wayback Machine downloaded from https://web.archive.org/web/20100211035829/http://www.hannibal.co.za/default.asp?pageid=540.

*Primary Examiner* — Corey N Skurdal
(74) *Attorney, Agent, or Firm* — Browdy and Neimark, PLLC

(57) ABSTRACT

Assemblies for supporting a load relative to a roof of a vehicle, and vehicle roof tray assemblies are disclosed. Disclosed assemblies include an elongate member and an engaging mechanism. The elongate member defines a support surface for supporting the load, and has a pair of opposed, diverging retention surfaces extending away from the support surface. The engaging mechanism is configured to abut the retention surfaces to engage the elongate member. A slat for a vehicle roof tray is also disclosed.

20 Claims, 16 Drawing Sheets

(56) References Cited

U.S. PATENT DOCUMENTS

| | | | |
|---|---|---|---|
| 4,616,771 | A | 10/1986 | Heideman |
| 5,577,650 | A | 11/1996 | Stapleton |
| 5,732,864 | A | 3/1998 | Stapleton |
| 8,132,701 | B2 | 3/2012 | Verhelst et al. |
| 2018/0072506 | A1 | 3/2018 | Stuart |

FOREIGN PATENT DOCUMENTS

| | | |
|---|---|---|
| AU | 331953 | 6/2010 |
| AU | 2011286169 | 2/2012 |

ASSEMBLIES FOR SUPPORTING A LOAD RELATIVE TO A ROOF OF A VEHICLE

CROSS-REFERENCE TO RELATED APPLICATIONS

This application is a Continuation-In-Part of U.S. patent application Ser. No. 16/738,144, filed on 9 Jan. 2020, which claims priority to Australian Provisional Patent Application Nos. 2019900072 and 2019901954, filed on 10 Jan. 2019 and 6 Jun. 2019, respectively. The content of these applications is incorporated herein by reference in their entirety.

TECHNICAL FIELD

The present disclosure relates generally to assemblies for supporting a load relative to a vehicle, such as above the roof, or above the tub or bed of a utility vehicle/truck.

BACKGROUND

To increase cargo earning capacity of a vehicle it is common to secure roof racks/bars to a roof of a vehicle. Such racks allow a load to be supported above the roof. To further enhance this arrangement, a roof tray may also be secured to the roof (or the roof racks). Roof trays provide a platform on which the load is supported and often include a guard rail extending around the platform to assist retaining the load on the platform.

The platform of a roof tray usually comprises a plurality of joined slats or bars to which objects, such as cargo or roof tray accessories, are removably secured. The objects are typically secured to the platform by various brackets and/or clamps, which may be configured to secure specific cargo to the roof tray, such as a bespoke shovel bracket or jack mount.

Additionally or alternatively, a tub or bed rack may be affixed across a tub/bed of a utility vehicle (also referred to as a pickup truck, or truck). Such racks typically comprise support bars arranged along or between opposed sides of the tub, and cross-bars secured between the side bars to form a rigid frame. The cross-bars and/or support bars can provide a platform on which to support cargo.

Providing a robust connection between the objects and a roof tray or tub rack can prove important as failure of this connection can result in the objects being lost during transit. This issue can be exacerbated if the vehicle is driven across uneven surfaces, such as when driving the vehicle 'off-road', as travelling across such surfaces typically transfers substantial vibrations/shocks to the roof tray and/or tub rack which increase the likelihood of the connection failing.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

According to some disclosed embodiments, there is provided an assembly for supporting a load relative to a vehicle, the assembly comprising: an elongate bar configured for fixing to the vehicle, the elongate bar having a sidewall and at least one support structure, the at least one support structure defining a pair of opposed, diverging retention surfaces, each retention surface extending away from the sidewall; and at least one engaging mechanism configured to be secured to the load, the at least one engaging mechanism defining a pair of opposed abutment surfaces shaped to be complementary to the retention surfaces, the abutment surfaces configured so that, in use, each abutment surface abuts and lies against one of the retention surfaces, the at least one engaging mechanism operable to urge the abutment surfaces against the retention surfaces to engage the elongate bar.

The elongate bar may include a pair of the support structures, where a first support structure extends from the sidewall in a first direction, and a second support structure extends from the sidewall in a second direction arranged transverse to the first direction.

The elongate bar may be shaped such that the second direction is arranged at an angle equal to, or greater than. 90 degrees to the first direction.

The elongate bar may be shaped such that, in use, the first direction is horizontal, and the second direction is generally downwards.

The at least one support structure may be at least partially surrounded by a recess defined by the sidewall.

The retention surfaces may be defined by at least one flange extending from the sidewall. The retention surfaces may be defined on opposed sides of a flared flange.

The elongate bar may be formed from an extrusion, and the support structure is an integrally formed portion of the extrusion.

The engaging mechanism may comprise two portions, each portion defining one of the abutment surfaces, and wherein at least one of the portions is movable relative to the other portion, so that, in use, the abutment surfaces urge against the retention surfaces.

The engaging mechanism may include an actuator operable to move at least one of the portions relative to each other. The actuator may be arranged to exert a linear force transversely to the retention surfaces.

Each retention surface may be planar, and the actuator be arranged to exert a linear force parallel to the plane of one of the retention surfaces.

The elongate bar may define opposed ends and form an arch between the ends, and the elongate bar be configured to have each end fixed to a tub of a vehicle to arrange the arch along a side, or between opposed sides, of the tub. The arch of the elongate bar may comprise a straight mid-section interposed between a pair of end portions. Each end portion may define a curved portion such that, in use, the midsection is arranged to be elevated from the tub of the vehicle.

The elongate bar may be configured as part of a frame configured for securing across a tub or a utility vehicle. In such embodiments the bar may be formed from sheet metal and joined to other elongate members to form the frame, such as by welding and/or with fasteners.

According to other disclosed embodiments, there is provided a vehicle tub rack assembly including: a pair of elongate bars configured for fixing to a tub of a vehicle to be spaced apart, each elongate bar having a sidewall and at least one support structure, the at least one support structure defining a pair of opposed, diverging retention surfaces, each retention surface extending away from the sidewall; and at least one engaging mechanism defining a pair of opposed abutment surfaces shaped to be complementary to the retention surfaces, the abutment surfaces configured so that, in use, each abutment surface abuts and lies against one of the retention surfaces, the at least one engaging mechanism operable to urge the abutment surfaces against the retention surfaces to engage one of the elongate bars.

The pair of elongate bars may be configured such that, in use, the at least one support structure of one of the elongate bars is arranged to extend towards the at least one support structure of the other elongate bar.

The tub rack assembly may include at least one cross-bar and an associated pair of the engaging mechanisms, each of the engaging mechanisms secured to the cross-bar and arranged to, in use, engage both of the elongate bars to arrange the cross-bar between the elongate bars.

Each of the elongate bars may define a support surface at an operatively top of the bar, and the at least one cross-bar comprise a slat defining opposed ends, and wherein each of the engaging mechanisms associated with the cross-bar are secured to one of the ends of the slat to allow, in use, arranging the slat to be flush with, or operatively below, the support surface.

According to other disclosed embodiments, there is provided a vehicle tub rack assembly including: a frame configured for fixing across a tub of a utility vehicle, the frame comprising a plurality of elongate members, and wherein at least one of the elongate members has a side and at least one support structure, the at least one support structure defining a pair of opposed, diverging retention surfaces, each retention surface extending away from the side; and at least one engaging mechanism defining a pair of opposed abutment surfaces shaped to be complementary to the retention surfaces, the abutment surfaces configured so that, in use, each abutment surface abuts and lies against one of the retention surfaces, the at least one engaging mechanism operable to urge the abutment surfaces against the retention surfaces to engage one of the elongate bars.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompany drawings in which.

DESCRIPTION OF EMBODIMENTS

Figure 11:
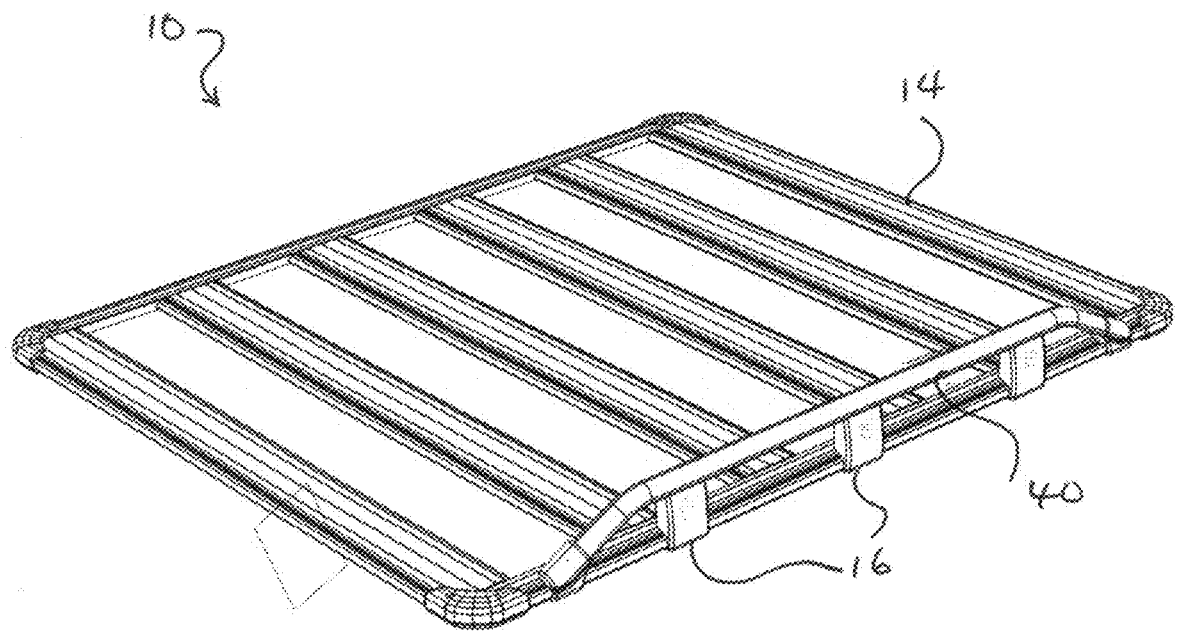
FIG. 11 is a perspective view of an alternative configuration of the assembly shown in FIG. 1 including a guard rail arranged along one side of the platform.

In the drawings, reference numeral 10 generally designates a vehicle roof tray assembly 10 for supporting a load (not illustrated) relative to a roof of a vehicle (not illustrated). The assembly 10 includes a plurality of elongate members, in the form of slats 12, connected together to form a platform 14 (FIG. 1), and an engaging mechanism 16 (FIG. 11). Each slat 12 defines a support surface 18 for supporting the load, and each slat 12 has a pair of opposed, diverging retention surfaces 20 extending outwardly from the support surface 18. The engaging mechanism 16 is configured so that; in use, the engaging mechanism 16 abuts the retention surfaces 20 of one of the slats 12 to engage the slat 12.

Figure 1:
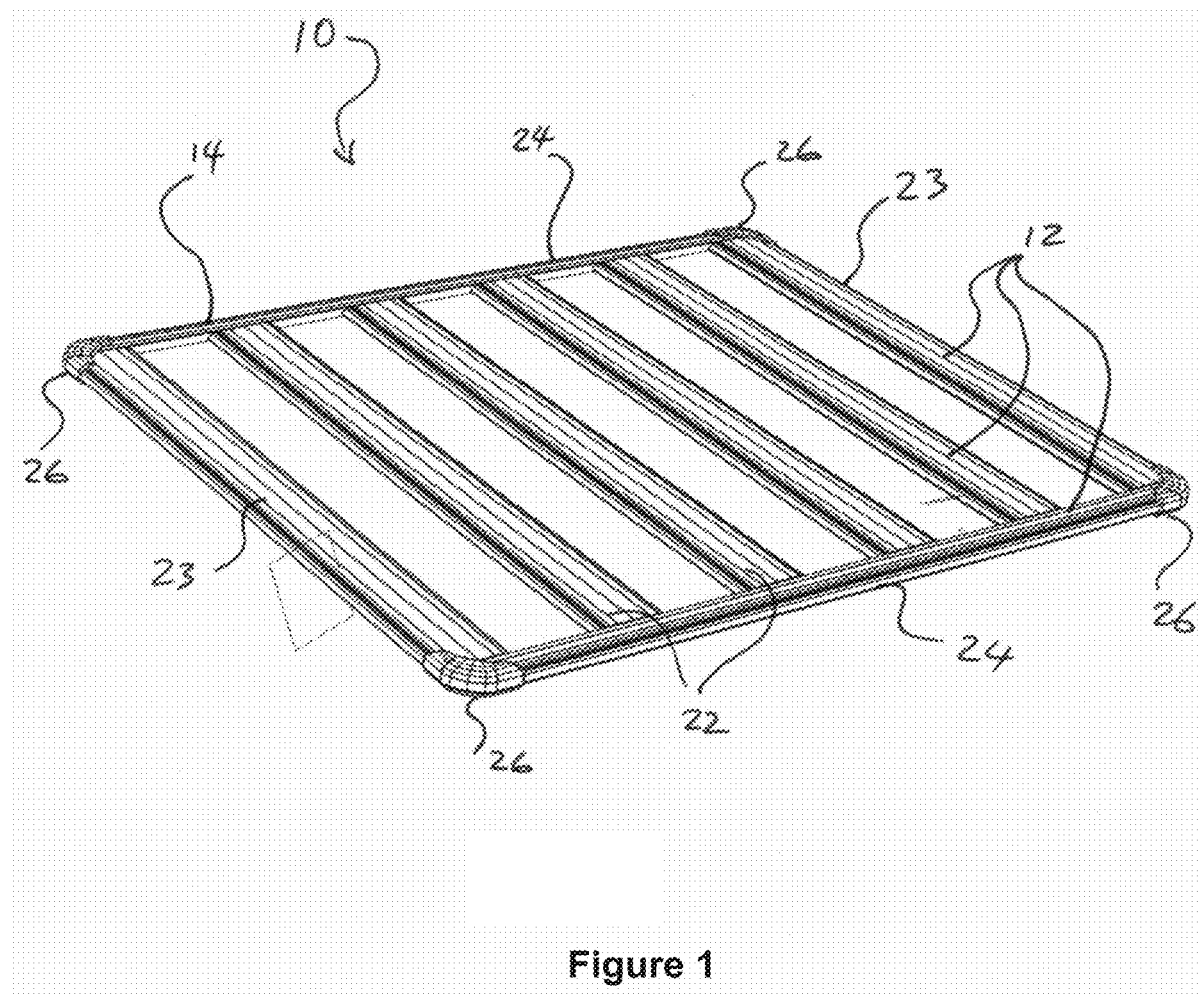
FIG. 1 is a perspective view of a vehicle roof tray assembly configured as a platform.

FIG. 1 shows the vehicle roof tray assembly 10. The roof tray 10 comprises cross-slats 22, 23 which are joined to side-slats 24 to form the platform 14. The platform 14 is configured to be affixed to a roof of a vehicle (not illustrated), or to roof racks/roof bars (not illustrated) which are secured to the vehicle, to support the load relative to the roof. The platform 14 is typically secured to the roof of the vehicle by a bracket (not illustrated) which is configured to conform and be fitted to a roof profile of one or more specific vehicle models.

The platform 14 is formed by a linear array of first cross-slats 22 and a pair of second cross-slats 23, arranged at opposed sides of the array, being joined to a pair of opposed side-slats 24. A corner assembly 26 is secured at each corner of the platform 14. The corner assembly 26 includes a pair of housings (not illustrated) which are arranged on opposed sides of the platform 14 and joined to each other, typically by a plurality of fasteners (not illustrated).

Figure 2:
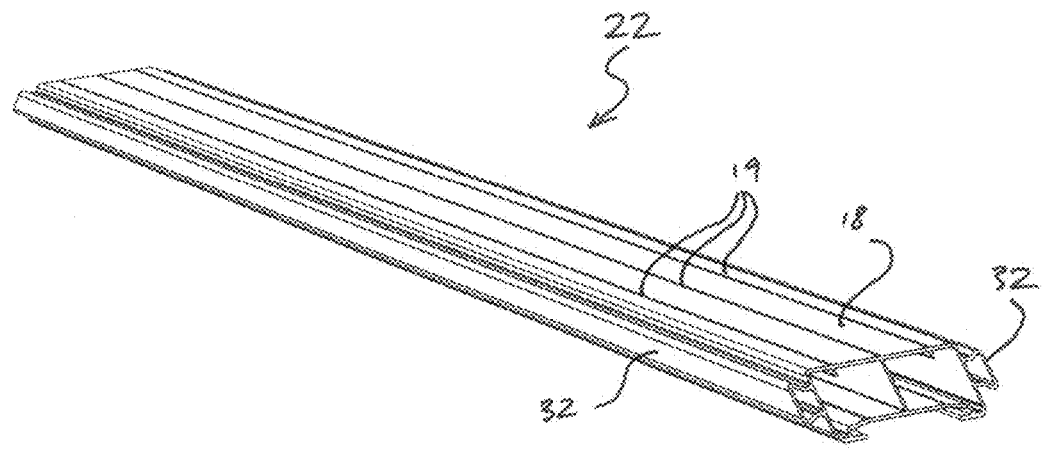
FIGS. 2 to 4 are perspective, side and end views, respectively, of a slat which forms part of the platform shown in FIG. 1.
Figure 3:
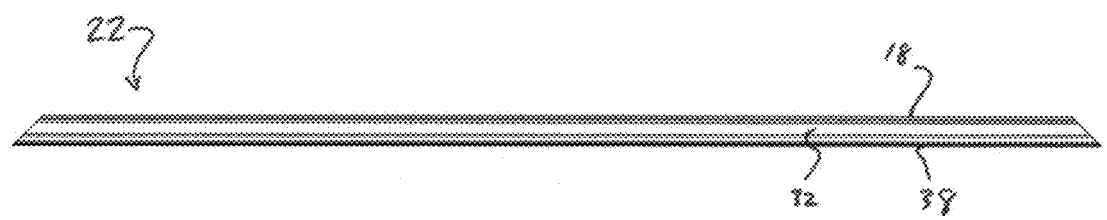
Figure 4:
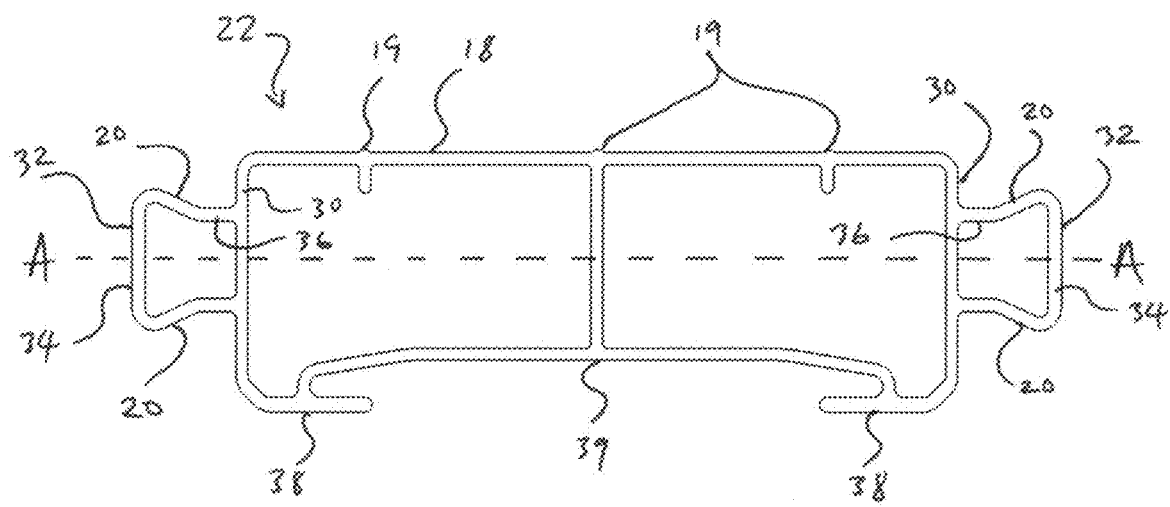
Figure 5:
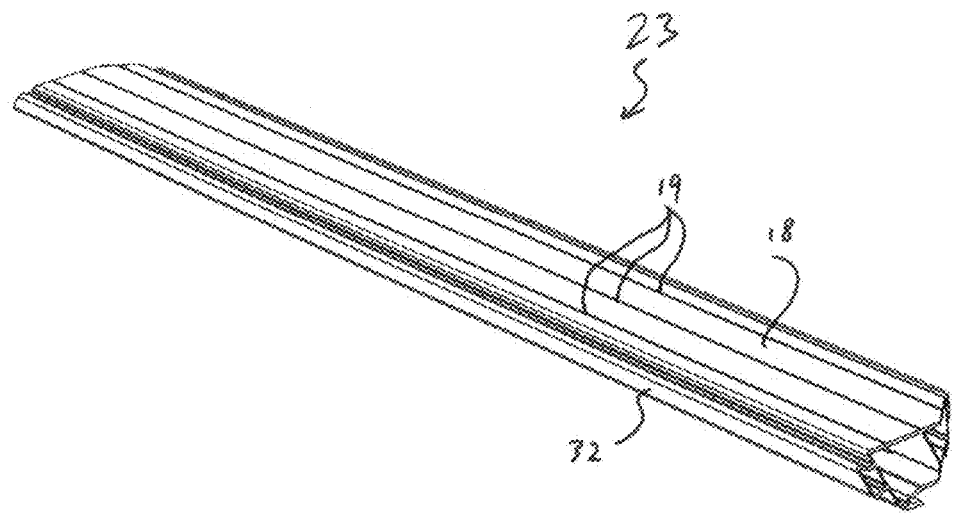
FIGS. 5 to 7 are perspective, top and end views, respectively, of an alternative configuration of the slat shown in FIGS. 2 to 4.
Figure 6:
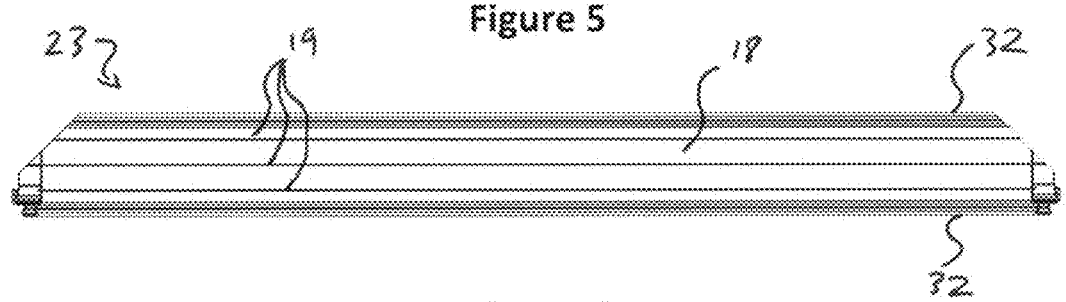
Figure 7:
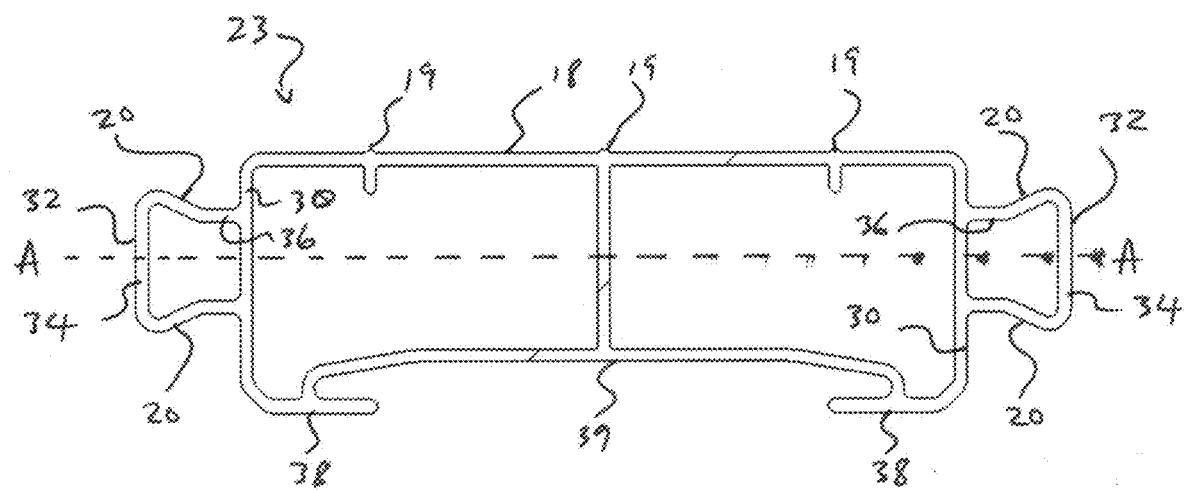
Figure 10:
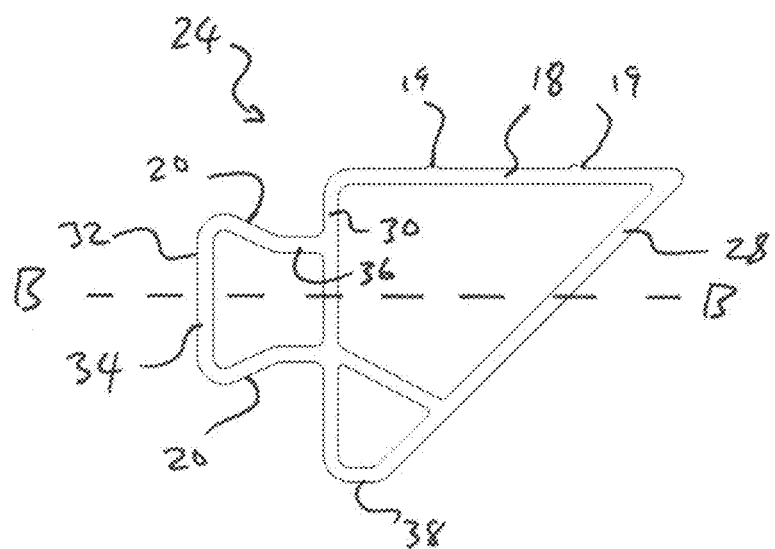

As shown in FIG. 10, each side-slat 24 defines a sloped junction surface 28 extending from one side of the support surface 18 diagonally towards the other side of the support surface 18. As shown in FIGS. 2 and 3, each end of each first cross-slat 22 is obliquely shaped to abut the junction surface 28. As shown in FIG. 5, each end of the second cross-slat 23 is also obliquely shaped to abut the junction surface 28. To assemble the platform 14, the cross-slats 22, 23 are arranged to abut the junction surfaces 28 of the side-slats 24 and welded to permanently affix the slats 22, 23, 24 together. It will be appreciated that other joining techniques may be employed, such as bonding with adhesive(s) and/or connecting with mechanical fasteners.

FIGS. 2 to 7 show the first and second cross-slats 22, 23. The second cross-slat 23 is an alternative configuration of the first cross-slat 22, where the ends of the second cross-slat 23 are shaped differently to the ends of the first cross-slat 22. The alternative configuration of the ends of the second cross-slat 23 enhances fitting within the corner assembly 26.

Each cross-slat 22, 23 defines the support surface 18, in the embodiment shown, being a substantially planar top surface 18 defining three ridges 19 to enhance friction between the support surface 18 and the supported load. Viewed in cross-section (FIGS. 4, 7), the support surface 18 extends in a direction A-A. A pair of retention surfaces 20 are arranged extending outwardly from each side of the support surface 18 to diverge relative to the direction A-A. It will be appreciated that the retention surfaces 20 may be alternatively arranged to extend away from the support surface 18, for example, to extend perpendicularly away from the support surface 18 (not illustrated).

Each cross-slat 22, 23 defines a base surface 38 either side of a base channel 39. The channel 39 is configured to receive a bracket (not illustrated) or fastener (not illustrated) to secure the slat 22, 23 to the vehicle (or a roof rack). The arrangement of the channel 39 in combination with the oblique shaped ends of the slats 22, 23 mean that the bracket/fastener can be arranged at any position along the slat 22, 23, including at or close to the end of the slat 22, 23, thereby optimising a range of positions available for fastening to suit a range of roof geometries defined by various models of vehicles.

In the illustrated embodiment, the cross-slat 22, 23 includes a side-wall 30 extending at each side of the support surface 18 and substantially perpendicular to the support surface 18. It will however be appreciated that the side-wall 30 may be alternatively configured to extend otherwise transverse to the support surface 18, for example, to define an oblique side-wall (not illustrated).

A flared flange 32 extends from at least one of the side-walls 30, in the embodiment shown, extending from each side-wall 30. The flange 32 defines the retention surfaces 20 on opposed sides, the retention surfaces 20 being configured as substantially planar surfaces arranged at an angle to the direction A-A, and includes an end face 34 joining a free end of each retention surface 20. A junction section 36 spaces the retention surfaces 20 from the side-wall 30. The flange 32 defines a free end, at the end wall 34, which is spaced operative below the plane of the support surface 18. This positions the entirety of the flange 32 at a level below the level of the support surface 18. It will however be appreciated that the flange 32 may be alternatively arranged, for example, to extend directly from the support surface 18 (not illustrated).

It will be appreciated that the cross-slats 22, 23 may be alternatively configured so that the retention surfaces 20 are arranged in an alternative position relative to each other and/or the support surface 18. For example, each cross-slat 22, 23 may have one of the retention surfaces 20 arranged immediately adjacent the support surface 18 to form an angled lip (not illustrated) running along an edge of the support surface 20. In this embodiment, the other retention surface 20 may be arranged immediately adjacent a base surface 38 to form another lip running along an edge of the base surface 38. Alternatively, or additionally, the retention surfaces 20 may not be joined by an end face 34 and, instead, define an at least partially open side of the cross-slat 22, 23. Further alternatively, the retention surfaces 20 may be defined on a pair of spaced, separate flanges or fins (not illustrated) extending at an angle from one of the side-walls 30. It will also be appreciated that the junction section 36 may be absent so that the retention surfaces 20 extend directly from the side-wall 30.

Figure 8:
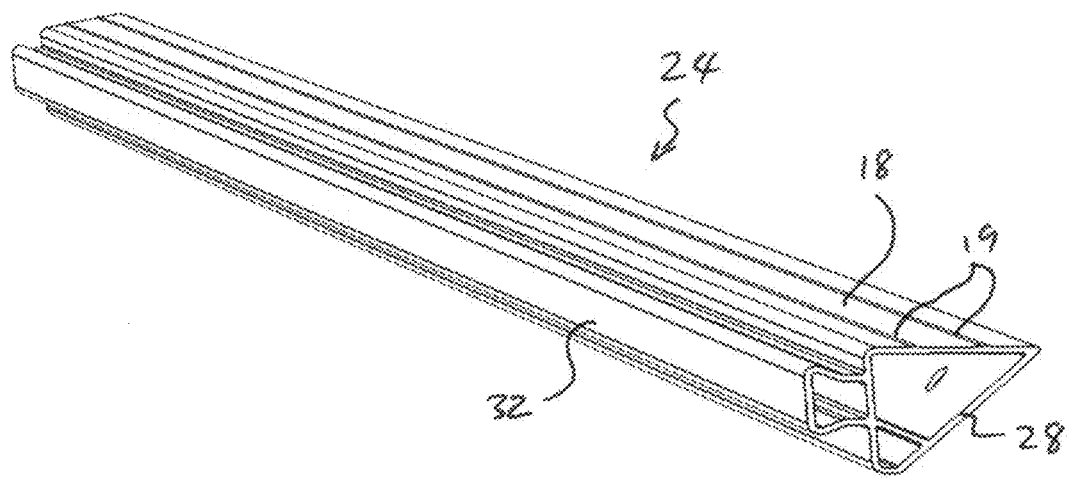
FIGS. 8 to 10 are perspective, top and end views, respectively, of an alternative slat which forms part of the platform shown in FIG. 1.
Figure 9:

FIGS. 8 to 10 show the side-slat 24. The side-slat 24 shares features with the cross-slats 22, 23, whereby common reference numerals indicate common features.

The side-slat 24 defines the support surface 18 and two ridges 19. Viewed in cross-section (FIG. 10), the support surface 18 extends in the direction B-B. A pair of retention surfaces 20 are arranged at one side of the support surface 18 to diverge away from the direction B-B. In the illustrated embodiment, the side-slat 24 includes a side-wall 30 extending at one side of the support surface 18 and the junction wall 28 extending from the other side of the support surface 18. The flared flange 32 extends from the side-wall 30 to define the retention surfaces 20, end face 34 and junction section 36.

In the illustrated embodiments, each of the cross-slats 22, 23 and side-slat 24 are formed as extrusions to define a consistent cross-section along a longitudinal length so that the flange 34 runs along the length of each slat 22, 23, 24. This means that when the slats 22, 23, 24 are connected together to form the platform 14, some of the flanges 34 extend from a periphery of the platform 14 to form a substantially continuous rail around the platform 14. This allows any of the engaging mechanisms 16 (discussed below) to be installed or removed at virtually any position around the periphery of the platform 14. Similarly, any of the engaging mechanisms 16 may be secured to any position along a side of any of the cross-slats 22, 23.

Each of the support surface 18 and the retention surfaces 20 are integrally formed surfaces of the extrusion. Configuring the slats 22, 23 24 as extrusions can prove cost-effective to manufacture as considerable lengths of each extrusion can be fabricated and then cut to a desired length and end profile. It will be appreciated that any of the slats 22, 23, 24 may be alternatively configured to comprise more than one part (not illustrated), including more than one extrusion, so that, for example, one part defining one or both retention surfaces 20 is joined to another part defining the support surface 18.

FIG. 11 shows an alternative configuration of the roof tray assembly 10 having a guard rail assembly 40 secured to the platform 14. The guard rail assembly 40 includes a plurality of engaging mechanisms 16 configured to releasably secure a guard rail 42 to the platform 14 and support the guard rail 42 relative to the support surface 18.

Figure 12:
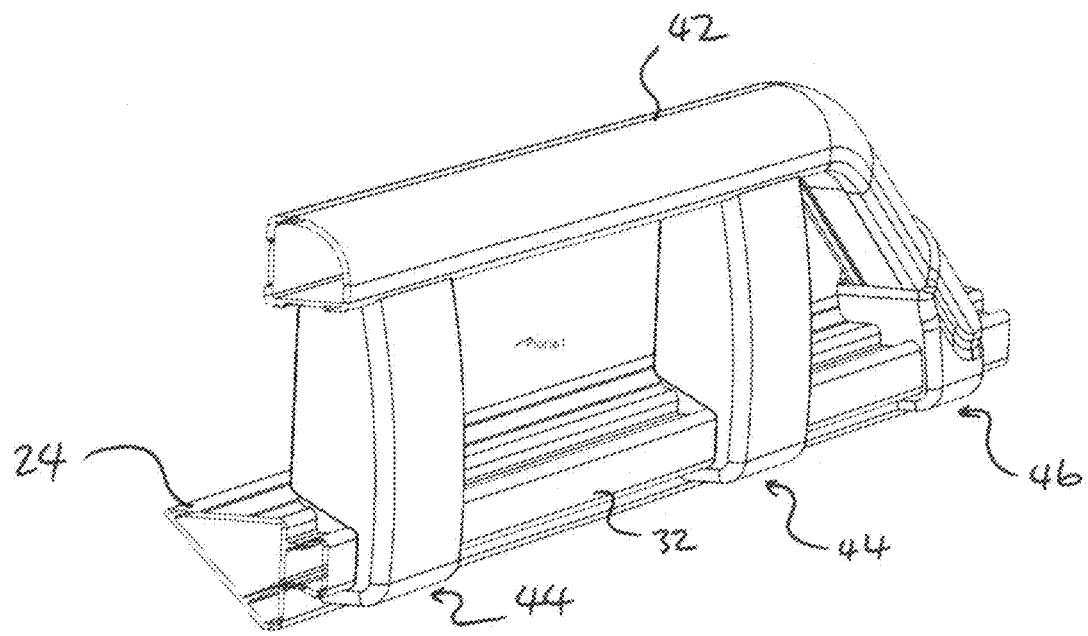
FIGS. 12 to 14 are perspective, exploded and cross-section views, respectively, of a mechanism for securing the guard rail to a slat of the assembly.
Figure 13:
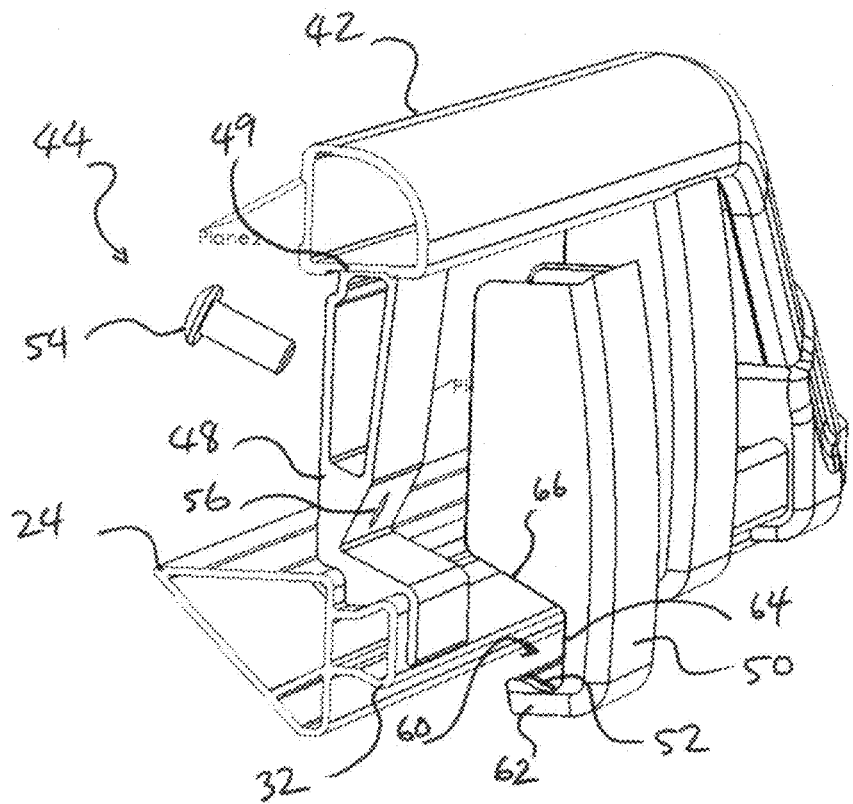
Figure 14:
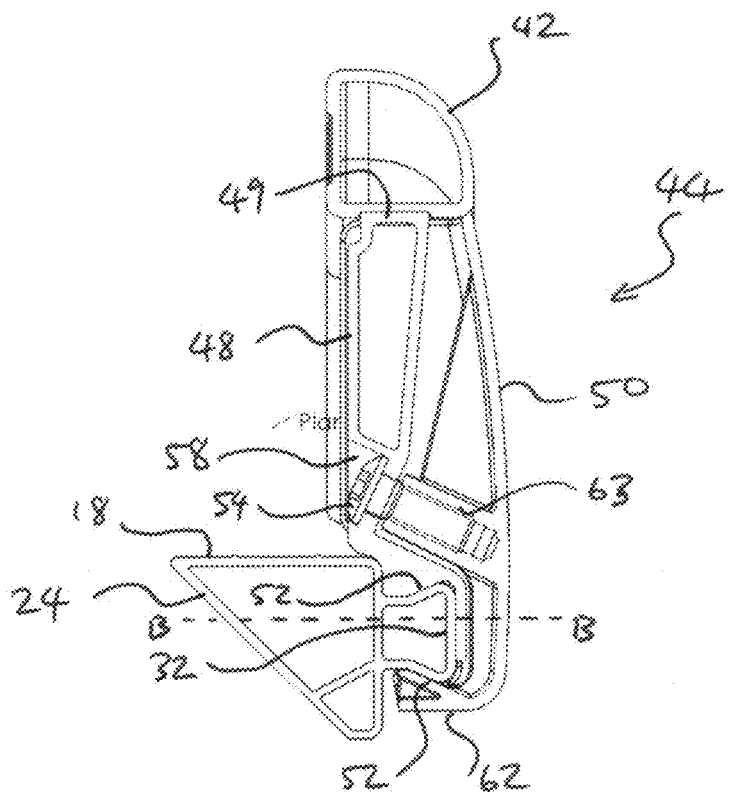
Figure 15:
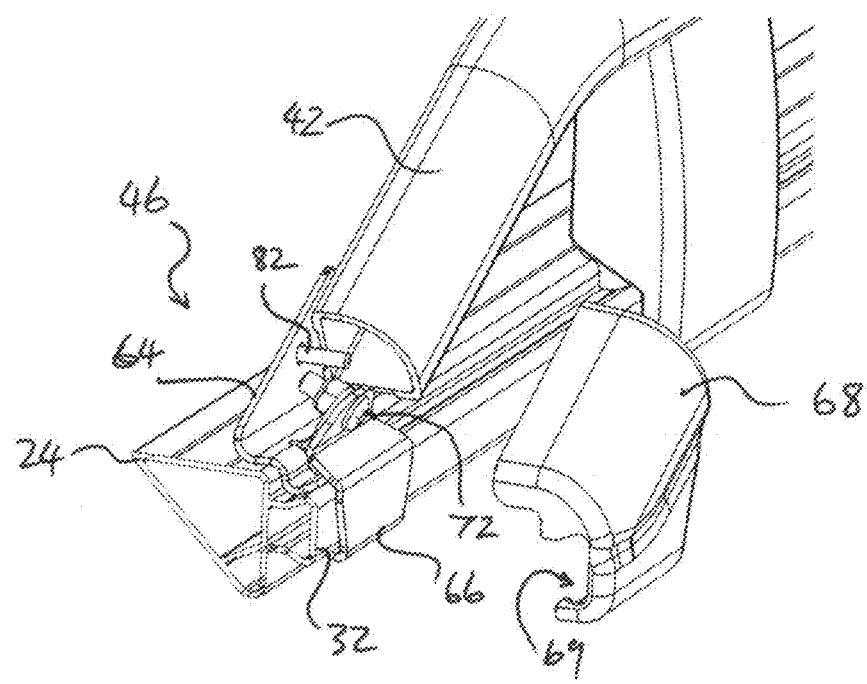
FIGS. 15 and 16 are perspective and exploded views, respectively, of an alternative mechanism for securing the guard rail to the slat.
Figure 16:
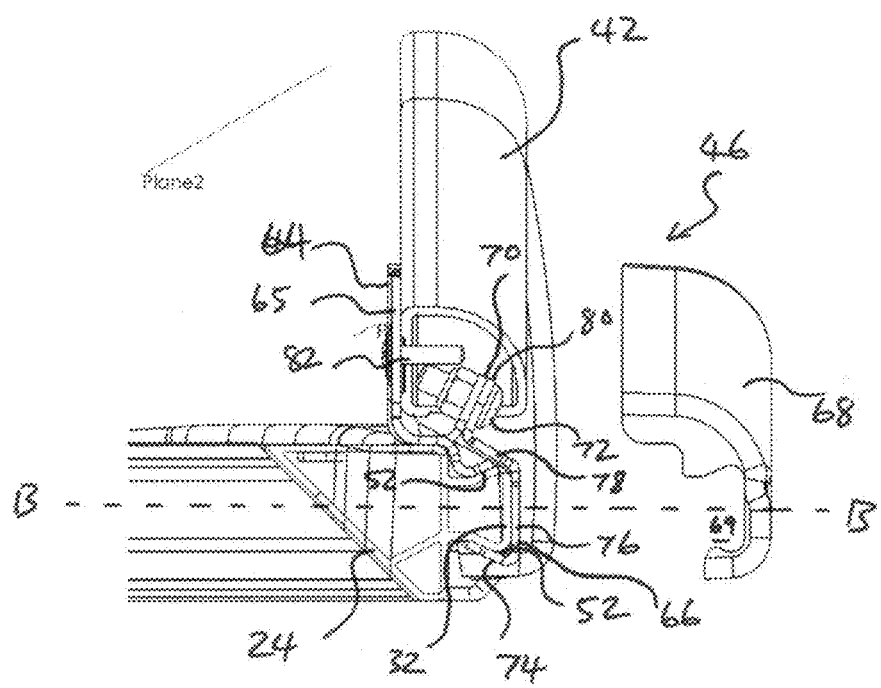

FIGS. 12 to 16 show two configurations of the engaging mechanism 16. FIGS. 12 to 14 show the engaging mechanism 16 configured as a support bracket sub-assembly 44. FIGS. 15 and 16 show the engaging mechanism 16 configured as an end cap sub-assembly 46. Whilst the sub-assemblies 44, 46 are shown secured to the flange 32 of the side-slat 24 it will be appreciated that the sub-assemblies 44, 46 are configured to be securable to the flange 32 of any of the cross-slats 22, 23.

The support bracket sub-assembly 44 comprises a first portion, configured as a bracket 48, and a second portion, configured as a cover 50, which is movable relative to the bracket 48. Each of the bracket 48 and the cover 50 define at least one abutment surface 52 arranged to, in use, abut against one of the retention surfaces 20. In the illustrated embodiment, each abutment surface 52 is configured to be complementary to the retention surface 20, being substantially planar and sloped at a complementary angle so that, in use, the abutment surface 52 lies against the retention surface 20.

The cover 50 is secured to the bracket 48 by an actuator, configured as a bolt 54, which is operable to cause at least one of the abutment surfaces 52 to move. Operating the bolt 54 draws the cover 50 towards the bracket 48. The bolt 54 is arranged transverse to the plane of the support surface 18, in the illustrated embodiment, being parallel to the angle of one of the retention surfaces 20. Arranging the bolt 54 in this way means that when the bolt 54 is operated, this exerts a linear force along an axis of the bolt 54 which causes the abutment surface 52 of the cover 50 to move along the adjacent retention surface 20. This action also at least partially urges the abutment surfaces 52 towards each other to clamp against the retention surfaces 20 to engage the sub-assembly 44 with the slat 24. This action may also cause the cover 50 to clamp against the end wall 34 of the flange 32.

The bracket 48 defines a free end 49 configured to join to the guard rail 42, typically being welded in place. The bracket 48 is shaped to abut against at least one of the support surface 18 and the end face 34. Shaping the bracket 48 in this way minimises movement of the bracket 48 relative to the slat 24 in the direction B-B, thereby assisting positioning the guard rail 42 relative to the support surface 20. This arrangement is useful as this allows the guard rail 42, joined to a plurality of brackets 48, to be lowered on to the platform 14 and easily located on adjacent flanges 32. The bracket 48 defines an aperture 56 and associated recess 58 which arranges the bolt 54 at the required angle, transverse to the direction B-B. In the illustrated embodiment, the bracket 49 is formed as an extrusion.

The cover 50 is shaped to at least partially cover the bracket 48 and define an opening 60. The opening 60 defines a re-entrant portion 62, defining an at least partially hooked shape, at one side, a side-wall 64 extending from the re-entrant portion 62, and a sloped surface 66 extending from the side-wall 64 and arranged to at least partially slope away from the re-entrant portion 62. The side-wall 64 is dimensioned to receive the free ends of the retention surfaces 20, in the embodiment shown, by receiving the end face 34 of the flange 32. The re-entrant portion 62 defines the abutment surface 52. Configuring the opening 60 in this way means that the cover 50 wraps around only one side of the flange 32, thereby allowing the cover 50 to be readily installed and removed from the bracket 48 from outside the periphery of the platform 14, thereby securing the guard rail 42 to the platform 14.

The cover 50 houses a threaded insert 63 arranged to receive and threadedly engage with the bolt 54. It will however be appreciated that the bracket 48 and cover 50 may be alternatively configured so that the bracket 48 houses the insert 63 and the bolt 54 be operated from the cover-side, where the bolt 54 is inserted through the cover 50 to engage with the insert 63. In the illustrated embodiment, the cover 50 is formed as an injection moulding or die-casting.

The end cap sub-assembly 46 comprises a first portion, configured as an inner bracket 64, a second portion, configured as an outer bracket 66 and which is movable relative to the inner bracket 64, and an alternative cover 68. Each of the inner bracket 64 and the outer bracket 66 define at least one abutment surface 52 arranged to, in use, abut against one of the retention surfaces 20.

The inner bracket 64 defines a wall 65 arranged to join to the guard rail 42, typically being welded in place. The inner bracket 64 is shaped to receive a portion of the support surface 18, side-wall 30, junction section 36, and one retention surface 20. The inner bracket 64 has a tab 70 which defines an aperture for a bolt 72. The arrangement of the tab 70 arranges the bolt 72 transverse to the direction B-B and generally parallel to one of the retention surfaces 20. In the illustrated embodiment, the inner bracket 64 is formed from sheet metal.

The outer bracket 66 defines a re-entrant portion 74 at one side, defining an at least partially hooked shape, a side-wall 76 extending from the re-entrant portion 74, a sloped surface 78 extending from the side-wall and arranged to at least partially slope away from the re-entrant portion 74, and a tab 80 extending from the sloped surface 78 and defining an aperture for the bolt 72. The side-wall 76 is dimensioned to receive the end face 34 of the flange 32. The re-entrant portion 74 defines the abutment surface 52. Operating the bolt 72 draws the abutment surface 52 of the re-entrant portion 74 along the adjacent retention surface 20 causing the outer bracket 66 and inner bracket 64 to clamp the flange 32. In the illustrated embodiment, the outer bracket 66 is formed from sheet metal.

The cover 68 is shaped to cover the inner bracket 64 and the outer bracket 66. The cover 68 defines a thread to allow a fastener 82 to secure the cover 68 to the inner bracket 62. The cover defines an opening 69 at one end having a complementary shape to the flange 32. The opening 69 allows the cover 68 to be slid over the flange 32 from one end of the slat 24, or be resiliently deformed to snap-fit over the flange 32, so that the cover 68 engages the flange 32. In the illustrated embodiment, the cover 68 is formed as an injection moulding or die-casting.

Figure 17:
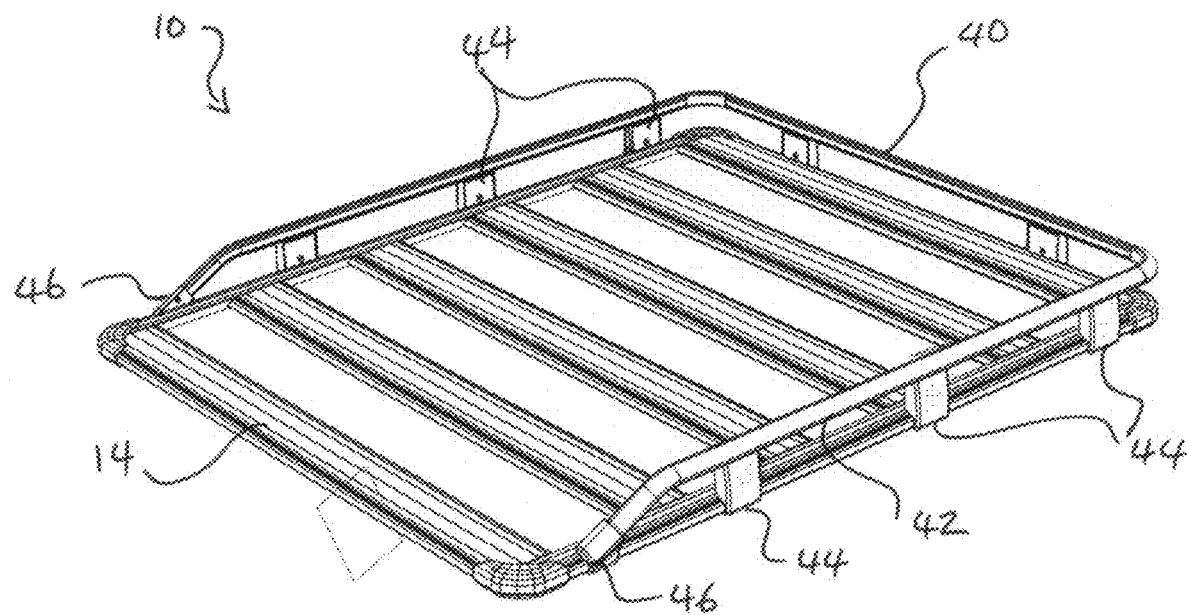
FIGS. 17 and 18 are perspective views of alternative configurations of the assembly shown in FIG. 1 including a guard rail arranged along three sides of the platform (FIG. 17), and in a continuous loop around a periphery of the platform (FIG. 18)
Figure 18:
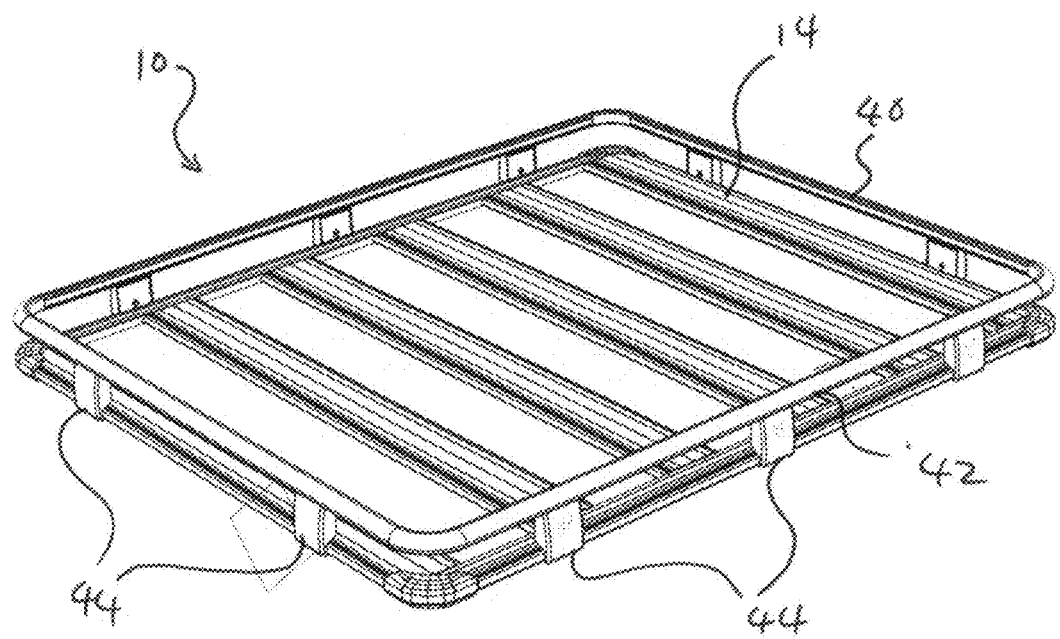

FIGS. 17 and 18 show alternative configurations of the assembly 10 having different guard rail assembly 40 configurations. FIG. 17 shows the guard rail assembly 40 configured so that the guard rail 42 extends around three sides of the platform 14 and is mounted to the platform by eight support bracket sub-assemblies 44 and two end cap sub assemblies 46. FIG. 18 shows the guard rail assembly configured so that the guard rail 42 extends around all four sides of the platform 14 and is secured to the platform 14 by ten support bracket sub-assemblies 44.

Figure 19:
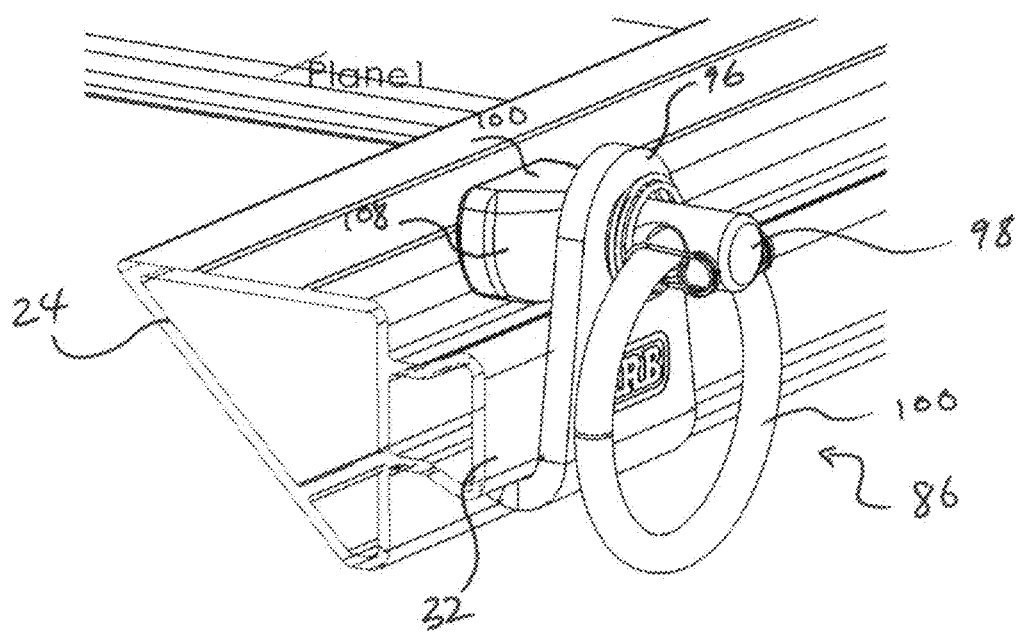
FIGS. 19 and 20 are perspective and cross-section views, respectively, of a mechanism for releasably connecting to one of the slats.
Figure 20:
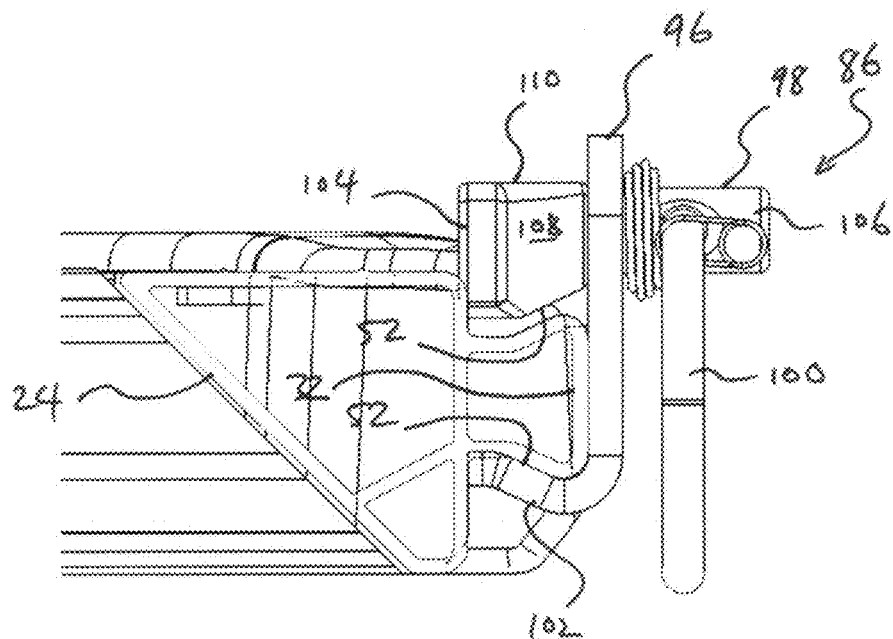
Figure 21:
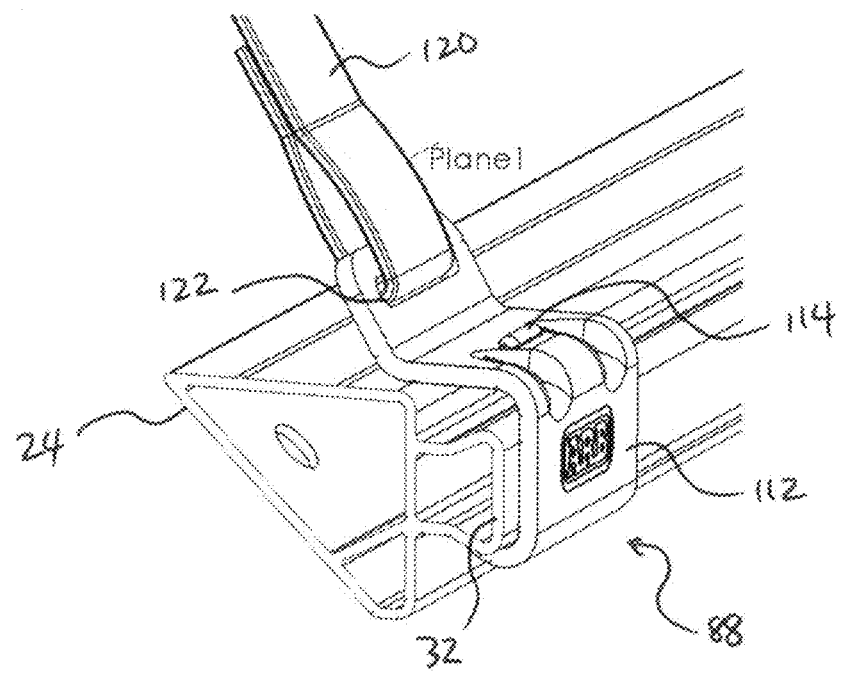
FIGS. 21 and 22 are perspective and cross-section views, respectively, of an alternative mechanism for releasably connecting to one of the slats.
Figure 22:
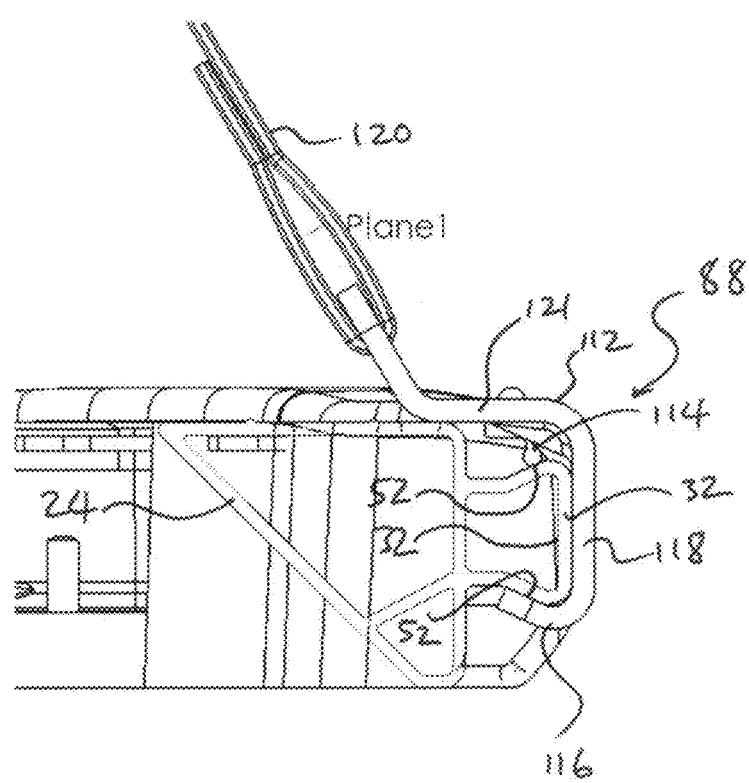
Figure 23:
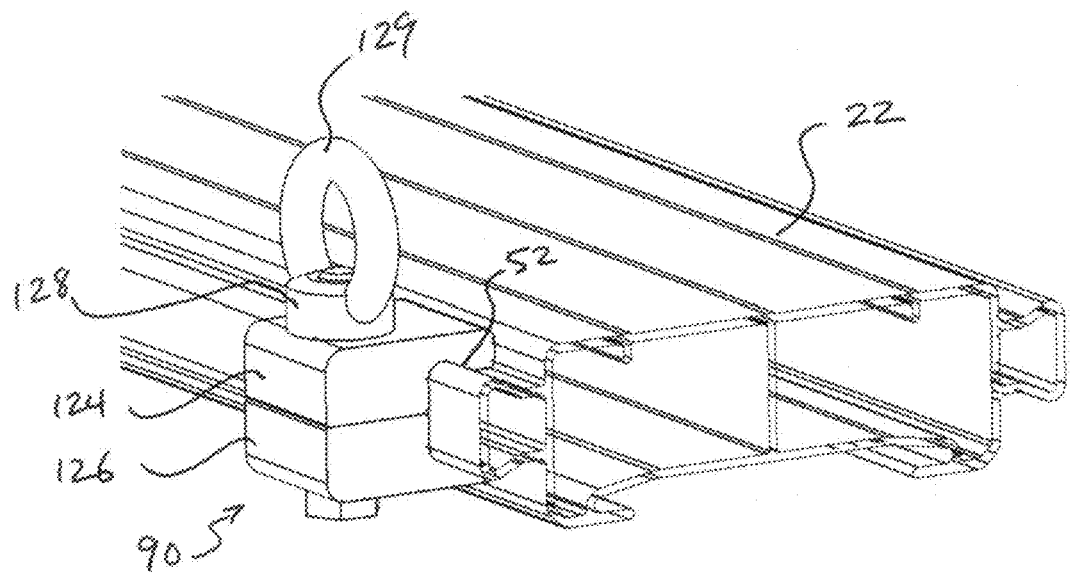
FIGS. 23 and 24 are perspective views of alternative configurations of a further alternative mechanism for releasably connecting to one of the slats.
Figure 24:
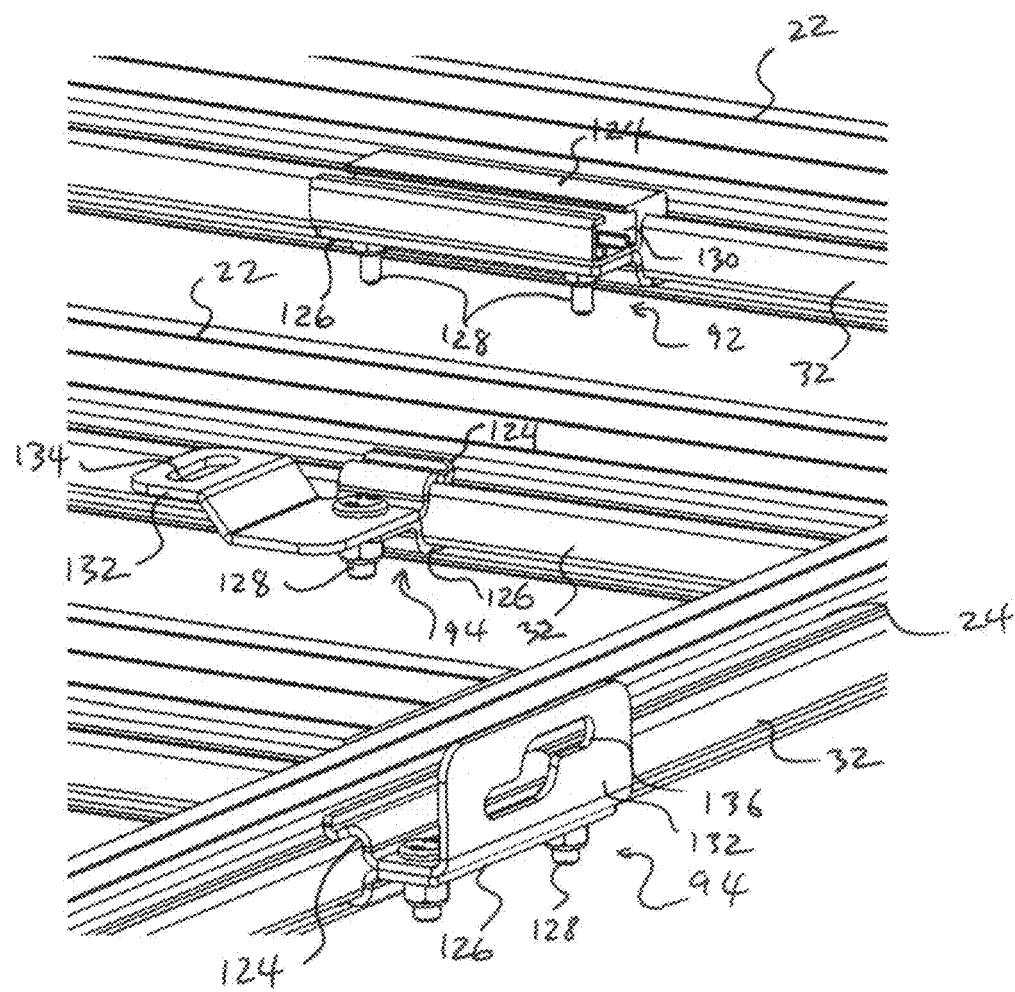

FIGS. 19 to 24 show three alternative configurations of the engaging mechanism 16 configured as various tie-down assemblies, each configured to enable a user to secure a strap, rope, cable, or the like, to the platform 14 to allow the user to tie the load to the platform 14. FIGS. 19 and 20 show the engaging mechanism 16 configured as a quick release tie-down sub-assembly 86. FIGS. 21 and 22 show the engaging mechanism 16 configured as a strap tie-down sub-assembly 88. FIGS. 23 and 24 show the engaging mechanism 16 configured as variations of a heavy duty tie-down sub-assembly 90, 92, 94.

The quick release tie-down sub-assembly 86 comprises a body 96, an actuator 98 which is movable relative to the body 96, and a connector 100. The body 96 includes a hooked portion 102 which defines an abutment surface 52 and an aperture (not visible). The actuator 98 defines a cam portion 104 and a shaft 106 extending from the cam portion 104. The cam portion 104 includes a flared or conical shaped section 108 having a flattened side 110. The conical section 108 defines the abutment surface 52. The shaft 106 extends through the aperture so that a free end is joined to the connector 100. In the illustrated embodiment, the connector 100 is configured as a ring to facilitate ease of connection to a range cords, such as ropes, cables, and straps, or connection mechanisms, such as carabiners or hooks. In use, rotation of the shaft causes the abutment surface 52 of the cam portion 104 to abut against one of the retention surfaces 20 for half of the rotation until the flattened side 110 faces towards the flange 32, whereby the abutment surface 52 ceases to abut the retention surface 20. The configuration of the actuator 98 in this way means that the user can readily engage or disengage the sub-assembly 86 with the slat 24 by rotating the actuator 180 degrees (or less).

The strap tie-down sub-assembly 88 comprises a body 112, a resilient member 114 which is movable relative to the body 112, and a strap 120. The body 112 includes a hooked portion 116 which defines an abutment surface 52, a sidewall 118 extending from the hooked portion 116 and a top section 121 which defines a slot 122 dimensioned to receive the strap 120. In the illustrated embodiment, the top section 121 is arranged relative to the hooked portion 116 so that the top section 121 abuts the support surface 18 of the slat 24 when the abutment surface 52 abuts one of the retention surfaces 20. It will be appreciated that the top section 120 may be alternatively configured, such as extending at an angle relative to, and not contacting, the support surface 18.

The resilient member 114 is joined to the body 112 and extends towards the hooked portion 116 to define another abutment surface 52. The abutment surface 52 of the resilient member 114 is arranged relative to the abutment surface 52 of the hooked portion 116 to cause the resilient member 114 to be resiliently deformed when the abutment surfaces 52 are arranged against the retention surfaces 20. In the illustrated embodiment, the resilient member 114 is formed entirely from a resiliently deformable material however it will be appreciated that only part of the member 114 which defines the abutment surface 52 may be formed from the resiliently deformable material.

The heavy duty tie-down sub-assemblies 90, 92, 94 are variations of the same assembly, whereby common reference numerals indicate common features. Each sub assembly 90, 92, 94 includes an upper jaw 124, a lower jaw 126 and an actuator, in the form of one or more bolts 128. Each jaw 124, 126 define an abutment surface 52. The jaws 124, 126 are movable relative to each other. Operating the bolt(s) 128 causes the jaws 124, 126 to move so that, in use, the abutment surfaces 52 urge against the retention surfaces 20 of any slat 22, 23, 24.

FIG. 23 shows a ring 129 joined to the bolt 128 to allow a cord or connector mechanism to be secured to the sub-assembly 90.

FIG. 24 shows the upper jaw 124 of one of the sub-assemblies 92 defining a channel 130. The channel 130 is shaped to receive a fastener, for example, to allow a I-shaped bolt to be secured to the platform 14, via the sub-assembly 92. This allows an accessory which utilises a T-bolt connector, such as a bicycle or kayak carrier, to be secured to the platform 14.

FIG. 24 also shows the upper jaw 124 of two other sub-assemblies 94 defining bracket 132. In the illustrated embodiments, the bracket 132 defines an aperture 134 or slot 136 and is arranged to extend, in use, parallel or perpendicular relative to the support surface 18. The bracket 132 allows a range of other accessories or objects, such as jacks, awnings, jerry cans, gas bottles, and the like, to be secured to the platform 14.

Figure 25:
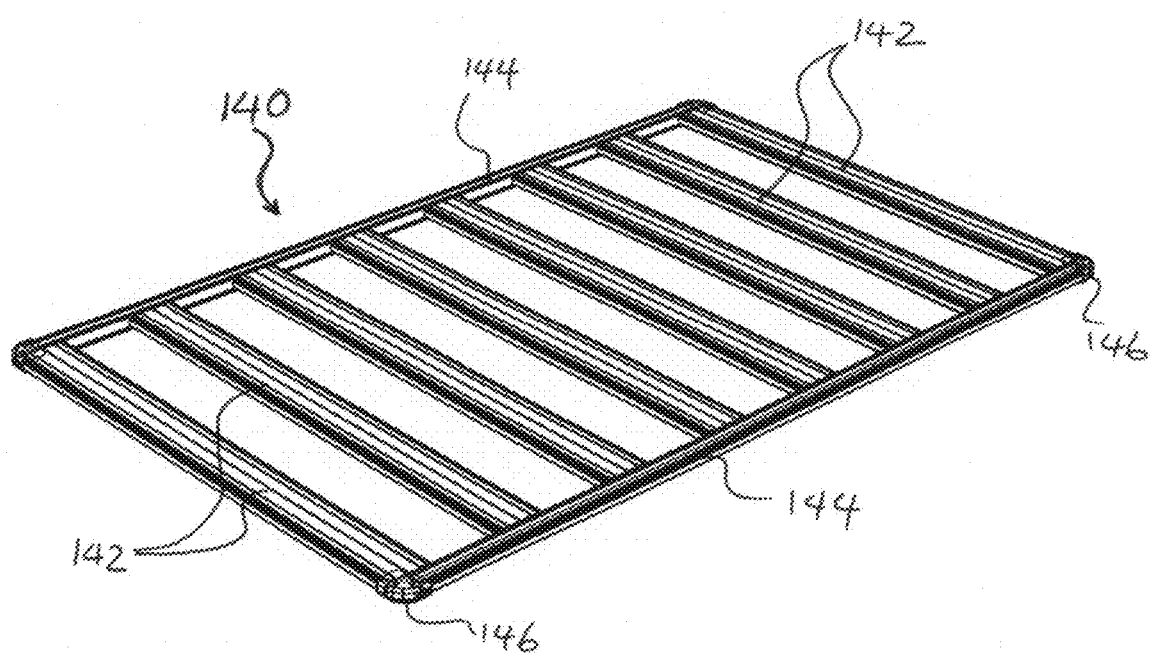
FIG. 25 is a perspective view of an alternative embodiment of a vehicle roof tray assembly configured as a platform.

FIG. 25 shows an alternative vehicle roof tray assembly, in the form of a platform 140. The platform 140 shares features with the platform 14 described above, whereby common reference numerals indicate common features.

The platform 140 comprises cross-slats 142 which are joined to side-slats 144. Each cross-slat 142 and side-slat 144 includes an opposed pair of the flanges 32 which define the retention surfaces 20. This allows the platform 140 to be secured to an engaging mechanism 16, such as any of the support bracket sub-assembly 44, end cap sub-assembly 46, or the tie-down sub-assemblies 86, 88, 90, 92, 94.

The platform 14 is formed from a linear array of the cross-slats 144 being joined to a pair of the side-slats 144. A corner assembly 146 is secured at each corner of the platform 140. The corner assembly 146 includes a pair of housings (not illustrated) which are arranged on opposed sides of the platform 14 and joined to each other, typically by a plurality of fasteners (not illustrated).

Figure 26:
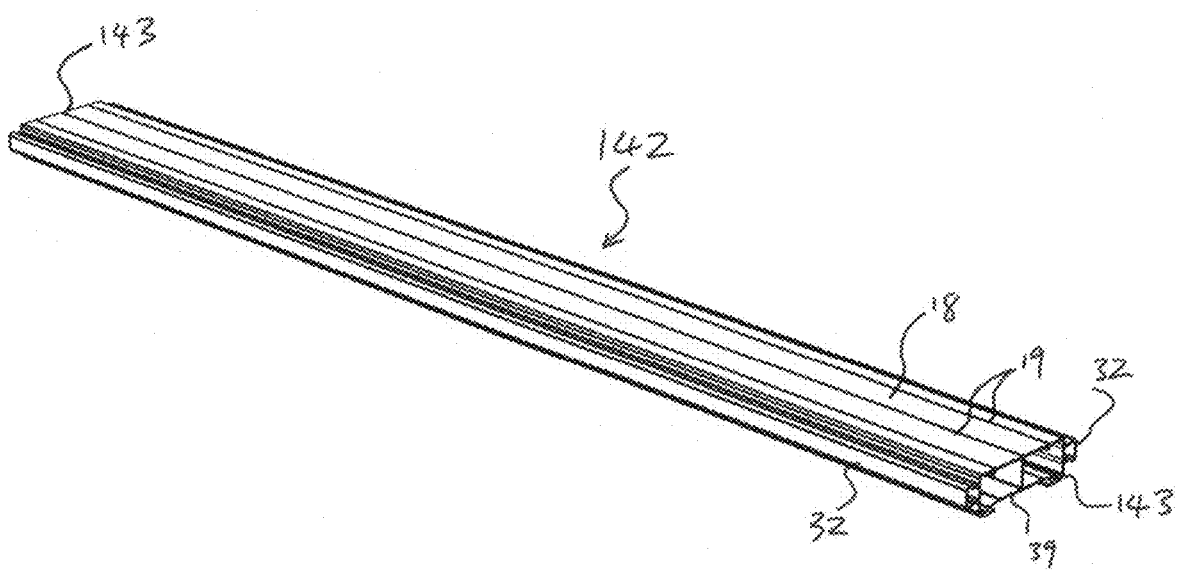
FIG. 26 is a perspective view of a slat which forms part of the platform shown in FIG. 25.
Figure 27:
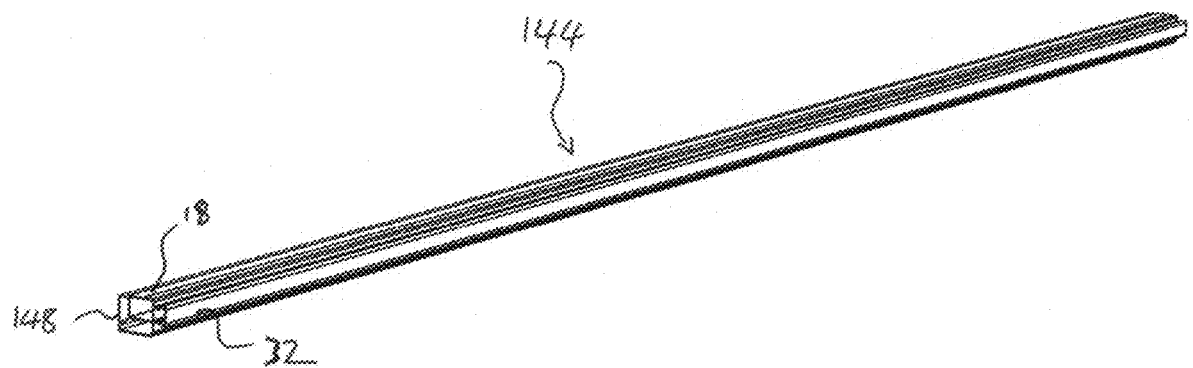
FIGS. 27 and 28 are perspective and end views, respectively, of an alternative slat which forms part of the platform shown in FIG. 25
Figure 28:
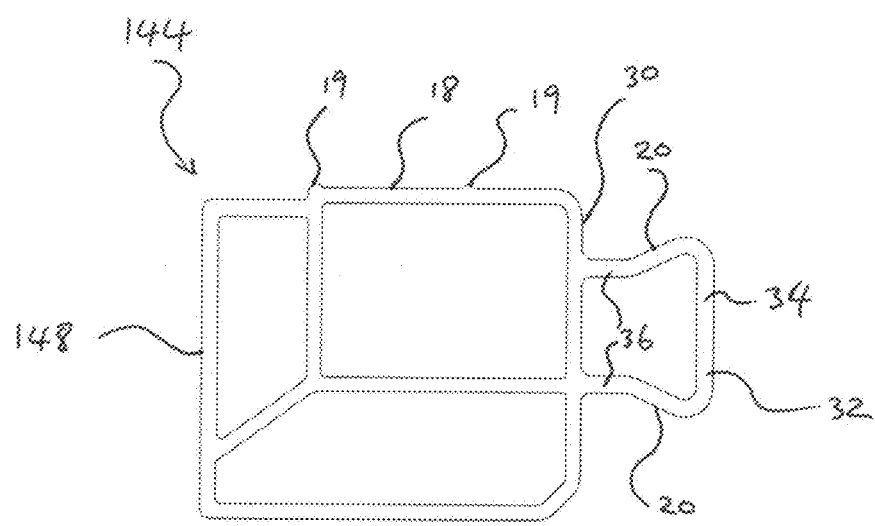

As shown in FIG. 28, each side-slat 144 defines a substantially box-shaped cross-section having a junction surface 148 arranged at one side of and perpendicular to the support surface 18. Each cross-slat 142 defines a cross-sectional profile which is identical to the slats 22, 23, shown in FIGS. 4 and 7, As shown in FIG. 26, each cross-slat 142 has straight-cut ends 143 to allow abutting the cross-slat 142 against the junction surface 148.

FIGS. 29 to 35 illustrate an alternative embodiment 200 of an assembly for supporting a load relative to a vehicle where the assembly 200 is configured as a tub rack 200 (also referred to as a bed rack) configured for supporting load relative to a tub 202 or bed of a utility vehicle 204 (FIG. 30) or truck. Best shown in FIG. 30, the tub rack 200 is typically configured to be affixed to the tub 202 to support the load in an elevated position and across the tub 202.

The assembly 200 includes an elongate bar 210 configured for fixing to the vehicle 204, and at least one engaging mechanism 212 configured to be secured to the load and operable to engage the bar 210. The elongate bar 210 has a sidewall 214 and at least one support structure 216, the at least one support structure 216 defining a pair of opposed, diverging retention surfaces 218. Each retention surface 218 extends away from the sidewall 214. The, or each, engaging mechanism 212 defines a pair of opposed abutment surfaces 220 shaped to be complementary to the retention surfaces 218. The abutment surfaces 220 are configured so that, in use, each abutment surface 220 abuts and lies against one of the retention surfaces 218. The, or each, engaging mechanism 212 is operable to urge the abutment surfaces 220 against the retention surfaces 218 to engage the elongate bar 210. It will be appreciated that the, or each, engaging mechanism 212 is configurable according to any of the engaging mechanisms 16 described above.

Figure 29:
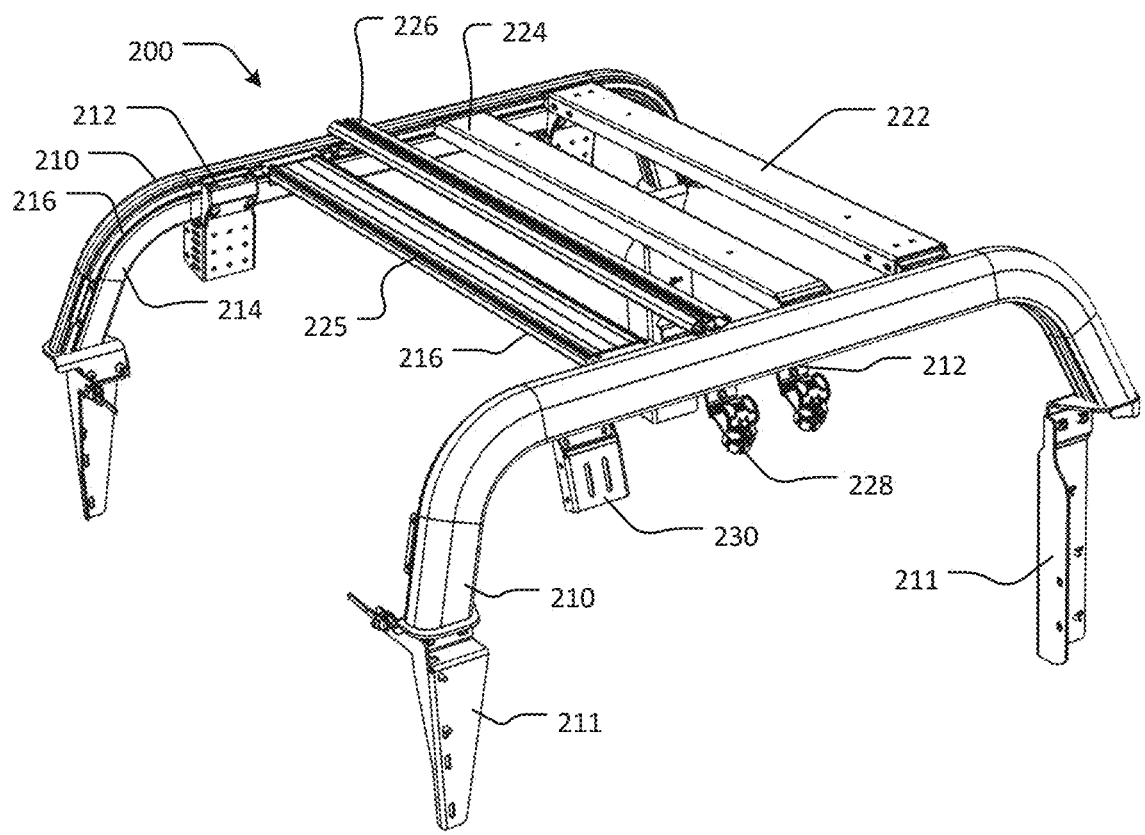
FIG. 29 is a perspective view of an assembly for supporting a load relative to a vehicle, the assembly configured as a tub rack to be affixed to the tub of the vehicle.
Figure 30:
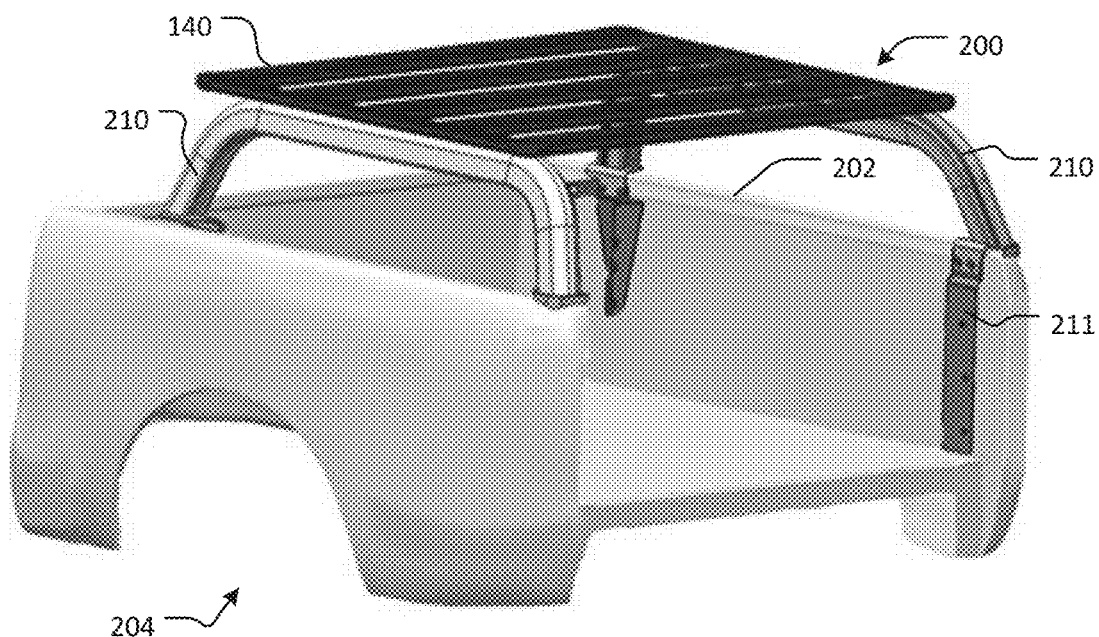
FIG. 30 is an environmental view showing the assembly of FIG. 29 secured to the tub of a vehicle and carrying the platform shown in FIG. 25.
Figure 31:
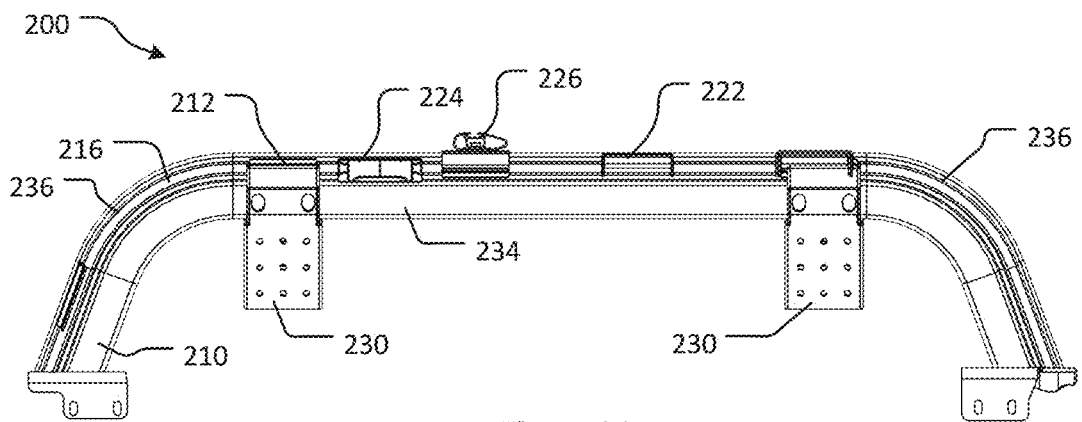
FIG. 31 is a side cross-section view.

FIG. 29 shows the assembly 200 in isolation, and FIG. 30 shows the assembly mounted to the tub 202 of the vehicle 204. In the illustrated embodiment, the assembly 200 includes a pair of the elongate bars 210 configured as side bars 210 to be secured along opposed sides of the tub 202 to be spaced apart from each other. Each side bar 210 is connected to a pair of tub mount sub-assemblies 211 configured to secure the side bar 210 to the tub 202. Best shown in FIG. 32, the bars 210 are shaped to be left or right sided, to be a mirror-image of each other, so that each bar 210 extends towards a centre of the vehicle, which may enhance rigidity of the assembly 200 under load. In other embodiments (not illustrated), the assembly 200 may include more or less bars 210, including only a single bar 210, and each bar 210 be configured for fixing between the opposed sides of the tub 202.

FIGS. 29 to 32 illustrate various accessories which can be mounted to one or both of the side bars 210 by one or more of the engaging mechanisms 212. The illustrated accessories include the platform 140 and various cross-bars 222, such as slats 224 and roof bars 226, mounted between the side bars 210, tool holders 228 mounted to an underside of one of the side bars 210 to allow suspending a tool, such as shovel, from and/or alongside the side bar 210, and universal mount structures 230 mounted to the underside of each side bar 210 to provide a robust, generic mount for securing a range of accessories to the bar 210. Other accessories (not shown) suitable for securing to one or both of the side bars 210 include tool clamps, fuel containers, jacks, auxiliary lights, shelves, and foldable tables. It will be appreciated that this list is exemplary, not exhaustive, and that other accessories are contemplated within the scope of this disclosure. When a plurality of the cross-bars 222 are connected between the side bars 210 this forms a frame securable to the tub 202. It will be appreciated that, in other embodiment (not illustrated), the cross-bars 222 and side bars 210 may be integrally formed to define the frame. It will also be appreciated that, in some embodiments, the elongate bar 210 is configurable as a cross-bar 222, such as slat 225 illustrated in FIG. 29, to arrange the support structure 216 between the side bars 210.

FIG. 30 illustrates the roof platform 140 mounted to both of the side bars 210, and the assembly 200 mounted to the vehicle 204. In this illustrated embodiment, the side bars 210 are shaped to arranged the roof platform 140 in an elevated position above and across the tub 202, and below the level of the roof of the cabin (not illustrated) of the vehicle 204. This arrangement can allow minimising wind noise caused by the roof platform 140 when driving the vehicle 204.

Figure 33:
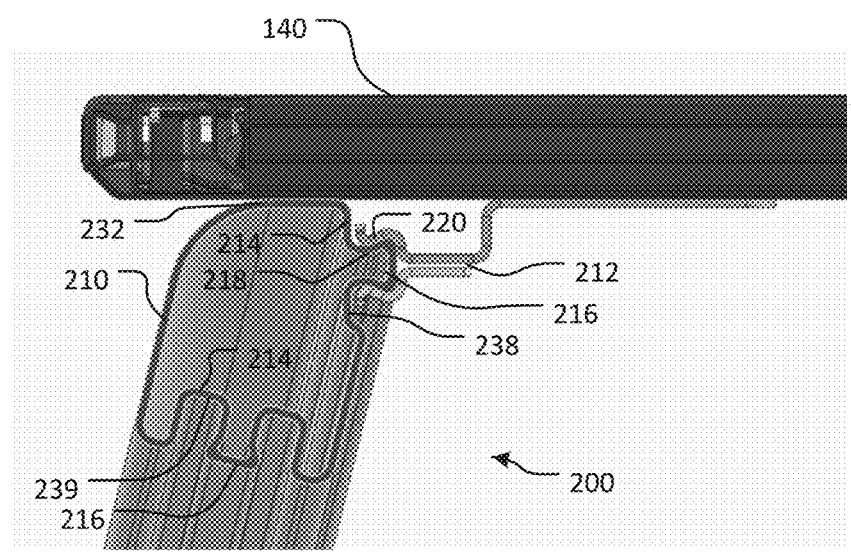
FIG. 33 is a detailed end cross-section view of the assembly shown in FIG. 29 to which the platform shown in FIG. 25 is mounted.

FIG. 33 illustrates the arrangement of one of the side bars 210 and the roof platform 140, in use, in more detail. The side bar 210 includes a support surface 232 configured to support load, in this embodiment, directly abutting an underside of the platform 140. In this embodiment, a plurality of the engaging mechanisms 212 are secured between the platform 140 and the side bars 210 to retain the platform 140 on the bars 210.

Figure 32:
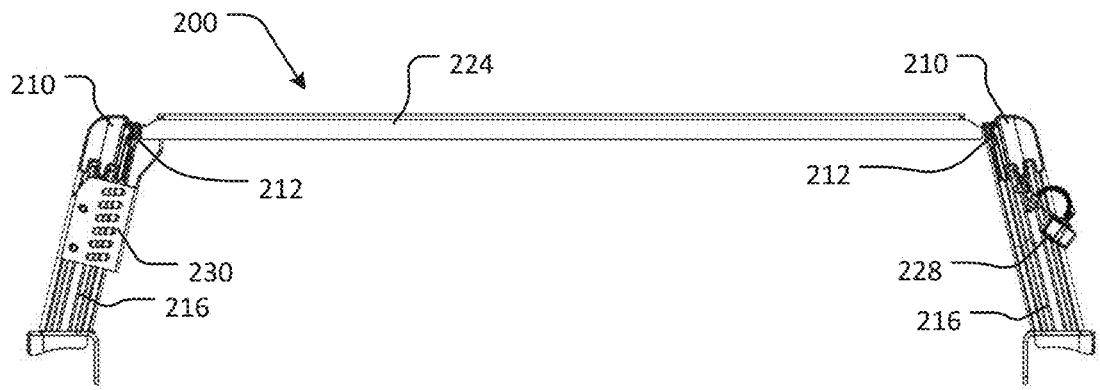
FIG. 32 is an end cross-section view, respectively, of the assembly shown in FIG. 29.

Best shown in FIG. 32, the side bars 210 are configured to be mounted to the tub 202 such that, in use, the support structure 216 of one bar 210 is arranged to extend towards the support structure 216 of the other bar 210. This allows securing, via a pair of the engagement mechanisms 212, an accessory, such as a cross-bar 222, between the pair of side bars 210. In some configurations, an engagement mechanism 212 is secured at each of opposed ends of the cross-bar 222 to allow mounting between the side bars 210, such as the slat 224 illustrated in FIG. 32. In such configurations, a plurality of slats 224 may be arranged, by the engagement mechanisms 212, to be flush with, or operatively below, the support surface 232 arranged at a top of each side bar 210. When arranged to be level with the support surfaces 232, this may allow the slats 224 and side bars 210 to form a platform to support load. In other configurations, a pair of the engagement mechanisms 212 are secured to an underside of the cross-bar 22 to allow mounting between and above, or abutting the support surface 232 of, the side bars 210, such as the roof bar 226 illustrated in FIGS. 29 and 31.

Returning to FIG. 31, in the illustrated embodiment 200, each side bar 210 defines opposed ends and is shaped to form an arch between the ends. The arch comprises a straight mid-section 234 interposed between a pair of end portions 236, each defining a curve. This arrangement means that, in use, the mid-section 234 is arranged to be spaced from and above the tub 202 to allow supporting the load. The, or each, support structure 216 is configured to extend along at least the mid-section 234 to form an elongate rail or flange. The configuration of the, or each, support structure 216 in this way allows each accessory to be mounted at any position along at least a portion, and typically a substantial portion, of the bar 210, which can enhance adaptability of the assembly 200.

Figure 35:
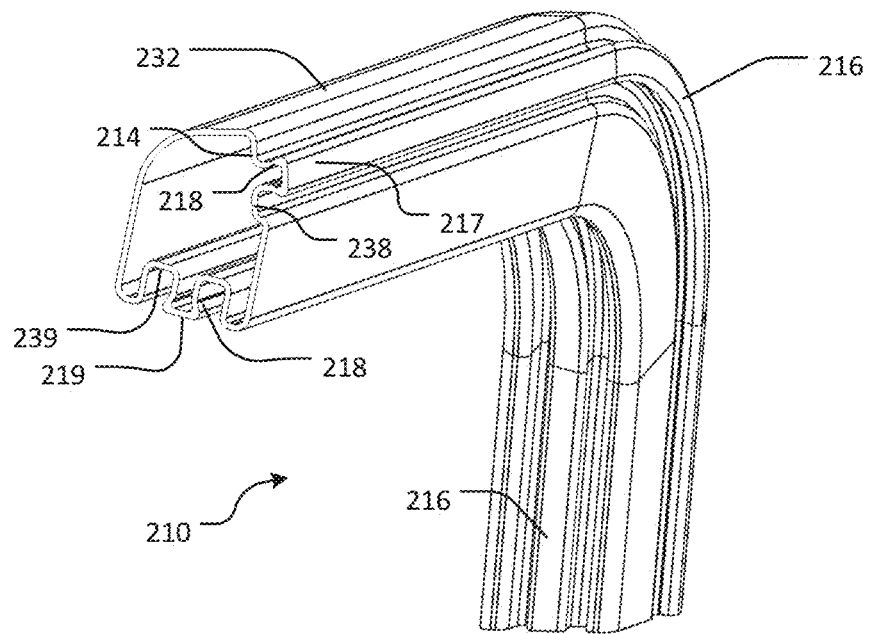
FIG. 35 is a perspective cross-section view of a component of the assembly shown in FIG. 29, being a side bar.

Best shown in FIG. 35, each side bar 210 includes a pair of the support structures 216 where a first support structure 217 extends from the sidewall in a first direction, and a second support structure 219 extends from the sidewall in a second direction arranged transverse to the first direction. In the illustrated embodiment, each side bar 210 is an extrusion and each support structure 216 is an integrally formed part of the extrusion which extends the full length of the extrusion, such that each support structure 216 is shaped to extend in the first or second direction away from the sidewall 214. In other embodiments (not illustrated), one or more support structures 216 may be formed separately from, and secured to, the side bar 210 to allow extending from the sidewall 214. For example, in some embodiments (not illustrated), the side bar 210 comprises a cylindrical tube and the support structures 216 are formed by one or more sleeves or collars mounted or affixed, such as by welding, along a portion of the tube. In yet other embodiments, the elongate bar 210 may be formed from sheet metal and the support structure 216 may be separately formed and joined to the bar 210, such as by welding or mechanical fasteners.

Figure 34:
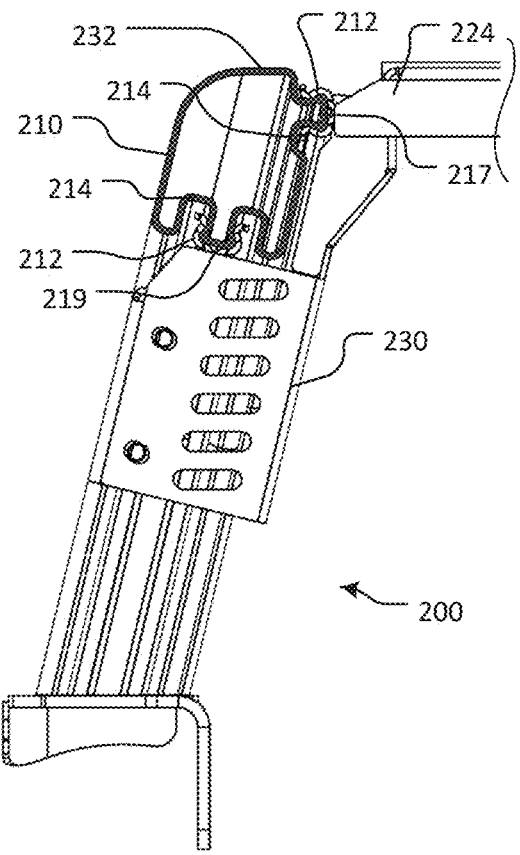
FIG. 34 is another detailed end cross-section view of the assembly shown in FIG. 29.

Best shown in FIGS. 33 and 34, in the illustrated embodiment 200, each side bar 210 is shaped such that the second direction is arranged at an angle equal to, or greater than, 90 degrees to the first direction. This means that, in use, the first direction is substantially horizontal, and the second direction is generally downwards. This allows accessories, such as the cross-bars 222, to be mourned between the first support structures 217, or at one side of the side bar 210, and also allows accessories, such as the tool holders 228, to be mounted to an underside of one of the side bars 210 to allow suspending the accessory, or another object, below the bar 210, or otherwise within an aperture defined between the bar 210 and the vehicle 204. FIG. 34 illustrates one of the slats 224 secured by one of the engaging mechanisms 212 to the first support structure 217 to extend from a side of the bar 210, and one of the universal mown structures 230 is secured by one of the engaging mechanisms 212 to the second support structure 219 to be arranged under the mid-section 234 of the bar 210. This configuration of the side bars 210 can further enhance adaptability of the assembly 200, allowing a wide range of accessories to be fixed to the assembly 200 in a wide range of different positions and/or orientations.

FIG. 35 shows both support structures 217, 219 may be at least partially arranged in a recess 238 defined by the sidewall 214 of the side bar 210. The first support structure 217 is shown partly within a recess 238 defined by the sidewall 214 adjacent an operatively lower side of the support structure 217. The second support structure 219 is substantially surrounded by a channel 239 defined by the sidewall 214, This configuration can protect the support structures 217, 219 from unintended impacts, such as when securing accessories to the assembly 200, as well as disguising the position of the support structure 217, 219, which can enhance aerodynamics and/or aesthetics of the assembly 200.

To assemble the platform 140, the ends 143 of the cross-slats 142 are positioned against the side-slats 144 and welded to permanently affix the slats 142, 144 together. It will be appreciated that other joining techniques may be employed, such as bonding with adhesive(s) and/or connecting with mechanical fasteners, for example, to allow releasable fixing the slats 142, 144 together.

Use of the assembly 10 involves positioning the platform 14 to be spaced above the roof of the vehicle and securing any of the engaging mechanisms 16 to the retention surfaces 20 defined by one of the slats 22, 23, 24. The load, such as cargo, is then supported on the support surface 18 of one or more of the slats 22, 23, 24 above the roof.

Use may involve securing an engaging mechanism 16 configured as a mounting bracket (not illustrated) to mount the platform 14 above the roof Additionally or alternatively, use may involve securing the guard rail 42, via a plurality of support bracket sub-assemblies 44 and/or a pair of end cap sub-assemblies 46, to one or more of the side-slats 24 and the second cross-slats 23 thereby arranging the guard rail 42 along at least one side of the platform 14. Further additionally or alternatively, use may involve securing one or more tie-down sub-assemblies 86, 88, 90, 92, 94 to the retention surfaces 20 defined by one of the slats 22, 23, 24 to allow an object, such as a cord, strap and/or accessory, to be secured to the platform 14.

The diverging configuration of the retention surfaces 20, relative to the support surface 18, is advantageous, as this provides a robust structure to engage the engaging mechanism 16. In particular, the diverging arrangement of the retention surfaces 20 optimises surface area for the engaging mechanism 16 to grip and assists distributing load across the associated slat 22, 23, 24.

The protruding arrangement of the retention surfaces 20 extending away from the support surface 18 minimises regions in which dust/dirt and/or moisture can collect, effectively defining a self-cleaning securement region due to air flow. This enhances ease of connecting the engaging mechanism 16 to the retention surfaces 20 and reduces the likelihood of the elongate member 14 corroding or otherwise failing due to material degradation. The protruding arrangement of the retention surfaces 20 relative to the support surface 18 also enhances manufacture as the retention surfaces 20 can be evenly coated, for example, during a powder coating process, which consequently enhances durability of the elongate member 14.

The arrangement of the flange 32, defining the retention surfaces 20, to be spaced perpendicularly from the support surface 18 means that the engaging mechanism 16, when engaging the retention surfaces 20, may be arranged level with or below the support surface 18. This arrangement is useful as this allows objects, such as cargo, to be moved along the support surface 18 unhindered by any engaging mechanism 16. This arrangement also allows the engaging mechanism 16 to be arranged between cross-slats 22, 23 to optimise use of space occupied by the platform 14 and without hindering passage of cargo across the platform 14.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An assembly for supporting a load relative to a vehicle, the assembly comprising:
   an elongate bar configured for fixing to the vehicle, the elongate bar having a sidewall and at least one support structure, the at least one support structure defining a pair of opposed, diverging retention surfaces, each retention surface extending away from the sidewall; and
   at least one engaging mechanism configured to be secured to the load, the at least one engaging mechanism defining a pair of opposed abutment surfaces shaped to be complementary to the retention surfaces, the abutment surfaces configured so that, in use, each abutment surface abuts and lies against one of the retention surfaces, the at least one engaging mechanism operable to urge the abutment surfaces against the retention surfaces to engage the elongate bar.

2. The assembly according to claim 1, wherein the elongate bar includes a pair of the support structures, wherein a first support structure extends from the sidewall in a first direction, and a second support structure extends from the sidewall in a second direction arranged transverse to the first direction.

3. The assembly according to claim 2, wherein the elongate bar is shaped such that the second direction is arranged at an angle equal to, or greater than, 90 degrees to the first direction.

4. The assembly according to claim 3, wherein the elongate bar is shaped such that, in use, the first direction is horizontal, and the second direction is generally downwards.

5. The assembly according to claim 1, wherein the at least one support structure is at least partially surrounded by a recess defined by the sidewall.

6. The assembly according to claim 1, wherein the retention surfaces are defined by at least one flange extending from the sidewall.

7. The assembly according to claim 6, wherein the retention surfaces are defined on opposed sides of a flared flange.

8. The assembly according to claim 1, wherein the elongate bar is an extrusion, and the support structure is an integrally formed portion of the extrusion.

9. The assembly according to claim 1, wherein the engaging mechanism comprises two portions, each portion defining one of the abutment surfaces, and wherein at least one of the portions is movable relative to the other portion, so that, in use, the abutment surfaces urge against the retention surfaces.

10. The assembly according to claim 9, wherein the engaging mechanism includes an actuator operable to move at least one of the portions relative to each other.

11. The assembly according to claim 10, wherein the actuator is arranged to exert a linear force transversely to the retention surfaces.

12. The assembly according to claim 10, wherein each retention surface is planar, and wherein the actuator is arranged to exert a linear force parallel to the plane of one of the retention surfaces.

13. The assembly according to claim 1, wherein the elongate bar defines opposed ends and forms an arch between the ends, and the elongate bar s configured to have each end fixed to a tub of a vehicle to arrange the arch along a side, or between opposed sides, of the tub.

14. The assembly according to claim 13, wherein the arch of the elongate bar comprises a straight mid-section interposed between a pair of curved portions.

15. The assembly according to claim 1, wherein the elongate bar is configured as part of a frame configured for securing across a tub or a utility vehicle.

16. A vehicle tub rack assembly including:
a pair of elongate bars configured for fixing to a tub of a vehicle to be spaced apart, each elongate bar having a sidewall and at least one support structure, the at least one support structure defining a pair of opposed, diverging retention surfaces, each retention surface extending away from the sidewall; and
at least one engaging mechanism defining a pair of opposed abutment surfaces shaped to be complementary to the retention surfaces, the abutment surfaces configured so that, in use, each abutment surface abuts and lies against one of the retention surfaces, the at least one engaging mechanism operable to urge the abutment surfaces against the retention surfaces to engage one of the elongate bars.

17. The vehicle tub rack assembly according to claim 16, wherein the pair of elongate bars are configured such that, in use, the at least one support structure of one of the elongate bars is arranged to extend towards the at least one support structure of the other elongate bar.

18. The vehicle tub rack assembly according to claim 17, including at least one cross-bar and an associated pair of the engaging mechanisms, each of the engaging mechanisms secured to the cross-bar and arranged to, in use, engage both of the elongate bars to arrange the cross-bar between the elongate bars.

19. The vehicle tub rack assembly according to claim 18, wherein each of the elongate bars define a support surface at an operatively top of the bar, and the at least one cross-bar comprises a slat defining opposed ends, and wherein each of the engaging mechanisms associated with the cross-bar are secured to one of the ends of the slat to allow, in use, arranging the slat to be flush with, or operatively below, the support surface.

20. A vehicle tub rack assembly including:
a frame configured for fixing across a tub of a utility vehicle, the frame comprising a plurality of elongate members, and wherein at least one of the elongate members has a side and at least one support structure, the at least one support structure defining a pair of opposed, diverging retention surfaces, each retention surface extending away from the side; and
at least one engaging mechanism defining a pair of opposed abutment surfaces shaped to be complementary to the retention surfaces, the abutment surfaces configured so that, in use, each abutment surface abuts and lies against one of the retention surfaces, the at least one engaging mechanism operable to urge the abutment surfaces against the retention surfaces to engage one of the elongate bars.

* * * * *